US011996919B2

(12) United States Patent
Mo et al.

(10) Patent No.: US 11,996,919 B2
(45) Date of Patent: May 28, 2024

(54) COMPOSITE BEAM GENERATION USING MACHINE LEARNING

(71) Applicant: Samsung Electronics Co., Ltd., Suwon-si (KR)

(72) Inventors: Jianhua Mo, Allen, TX (US); Boon Loong Ng, Plano, TX (US); Vutha Va, Plano, TX (US); Ahmad AlAmmouri, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/816,297

(22) Filed: Jul. 29, 2022

(65) Prior Publication Data

US 2023/0032241 A1    Feb. 2, 2023

Related U.S. Application Data

(60) Provisional application No. 63/227,741, filed on Jul. 30, 2021.

(51) Int. Cl.
*H04W 72/0453* (2023.01)
*H04B 7/0456* (2017.01)

(52) U.S. Cl.
CPC .................. *H04B 7/0456* (2013.01)

(58) Field of Classification Search
CPC .. H04B 7/0617; H04B 7/0456; H04B 7/0695; H04B 7/0639; H04B 7/0417; H04B 7/0452; H04W 16/28; H04W 24/02; H04W 24/10; H04W 72/541; H04W 72/046; H04W 56/001; H04W 72/23; H04L 5/0048; H04L 5/0057; H04L 5/0091; H04L 67/10; H04L 5/0051; H04L 1/0026; H04L 5/0023
USPC ........................................................ 375/267
See application file for complete search history.

(56) References Cited

U.S. PATENT DOCUMENTS

| | | | |
|---|---|---|---|
| 10,594,383 B1 | 3/2020 | Orhan et al. | |
| 10,735,066 B2 | 8/2020 | Mo et al. | |
| 11,201,647 B2 | 12/2021 | Frank et al. | |
| 11,223,394 B2 | 1/2022 | Lee et al. | |
| 11,303,336 B1* | 4/2022 | Marupaduga | H04B 7/0617 |
| 2017/0347276 A1* | 11/2017 | Yu | H04L 5/0053 |
| 2018/0124837 A1* | 5/2018 | Yu | H04B 7/0695 |
| 2018/0131426 A1* | 5/2018 | Lee | H04B 7/0617 |

(Continued)

*Primary Examiner* — Eva Y Puente

(57) ABSTRACT

Methods, apparatuses, systems, and computer-readable media for a composite beam generation using machine learning. A method includes identifying a narrow beam for a transmission, identifying a composite beam including the narrow beam based on an association between one or more composite beams and one or more narrow beams, identifying one or more beamforming weights for transmitting the composite beam, and transmitting the composite beam using the one or more beamforming weights. The one or more beamforming weights are determined based on machine learning. In some embodiments, the method includes generating a composite beam codebook including information indicating sets of one or more beamforming weights corresponding to composite beam indexes, respectively. The sets of one or more beamforming weights are determined using respective parameters of a machine learning algorithm that are separately updated for coverage regions of composite beams corresponding to the composite beam indexes, respectively.

20 Claims, 18 Drawing Sheets

(56) References Cited

U.S. PATENT DOCUMENTS

2020/0313741 A1\* 10/2020 Zhu ..................... H04B 7/0619
2020/0343985 A1\* 10/2020 O'Shea ................... G06N 3/08
2023/0006714 A1\* 1/2023 Mo ..................... H04B 7/0639

\* cited by examiner

COMPOSITE BEAM GENERATION USING MACHINE LEARNING

CROSS-REFERENCE TO RELATED AND CLAIM OF PRIORITY

The present application claims priority under 35 U.S.C. § 119(e) to U.S. Provisional Patent Application No. 63/227,741 filed on Jul. 30, 2021, which is hereby incorporated by reference in its entirety.

TECHNICAL FIELD

The present disclosure relates generally to wireless communication systems and, more specifically, the present disclosure relates to generation of composite beams using machine learning.

BACKGROUND

As wireless communication has grown and the number of subscribers to wireless communication services continues to grow quickly, demand of wireless data traffic is rapidly increasing due to the growing popularity among consumers and businesses. To meet the high growth in mobile data traffic and support new applications and deployments, improvements in radio interface efficiency and coverage are of paramount importance. Moreover, this demand for wireless data traffic has increased since deployment of 4G communication systems, and to enable various vertical applications, 5G (e.g., fifth generation) communication systems have been developed and are currently being deployed. Several characteristics of such applications have also been considered.

A basic philosophy of 5G or New Radio (NR) in 3rd Generation Partnership Project (3GPP) is to support beam-specific operations for wireless communication between a gNodeB (gNB) and a user equipment (UE). There are several components in the 5G NR specification that can efficiently be operated in a beam-specific manner. Note that the 5G communication system involves implementation to include higher frequency millimeter-wave (mmWave) bands, such as 28 GHz or 60 GHz bands or, in general, above 6 GHz bands, so as to accomplish higher data rates, or in lower frequency bands, such as below 6 GHz, to enable robust coverage and mobility support.

The mmWave beam codebook design is very important and challenging for the 5G mmWave base stations since, being different from low frequency bands, narrow beams are needed to support the high data transmission at the mmWave band due to the large mmWave band path-loss. A significant number of narrow beams may be needed to cover a wide angular region, for example, horizontally from −60 degree to +60 degree. On the other hand, due to the larger overhead of synchronization signal block (SSB) signaling (which refers to synchronization/physical broadcast channel (PBCH) block because the synchronization signal and PBCH channel are packed as a single block), especially in the 5G stand-alone system, the number of SSB beams, where each beam corresponding to an SSB index, cannot be large.

SUMMARY

The present disclosure relates to generation of composite beams using machine learning.

In one embodiment, a method is provided. The method includes identifying a narrow beam for a transmission, identifying a composite beam including the narrow beam based on an association between one or more composite beams and one or more narrow beams, identifying one or more beamforming weights for transmitting the composite beam, and transmitting the composite beam using the one or more beamforming weights. The one or more beamforming weights are determined based on machine learning.

In another embodiment, an apparatus is provided. The apparatus includes a first processor configured to identify a narrow beam for a transmission, identify a composite beam including the narrow beam based on an association between one or more composite beams and one or more narrow beams, and identify one or more beamforming weights for transmission of the composite beam. The one or more beamforming weights are determined based on machine learning. The apparatus further includes a transceiver operably coupled to the first processor. The transceiver is configured to transmit the composite beam using the one or more beamforming weights.

In one embodiment, a non-transitory, computer-readable medium is provided. The non-transitory, computer-readable medium includes program code that, when executed by a first processor of an apparatus, causes the apparatus to identify a narrow beam for a transmission, identify a composite beam including the narrow beam based on an association between one or more composite beams and one or more narrow beams, identify one or more beamforming weights for transmission of the composite beam, and transmit the composite beam using the one or more beamforming weights. The one or more beamforming weights are determined based on machine learning.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many, if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
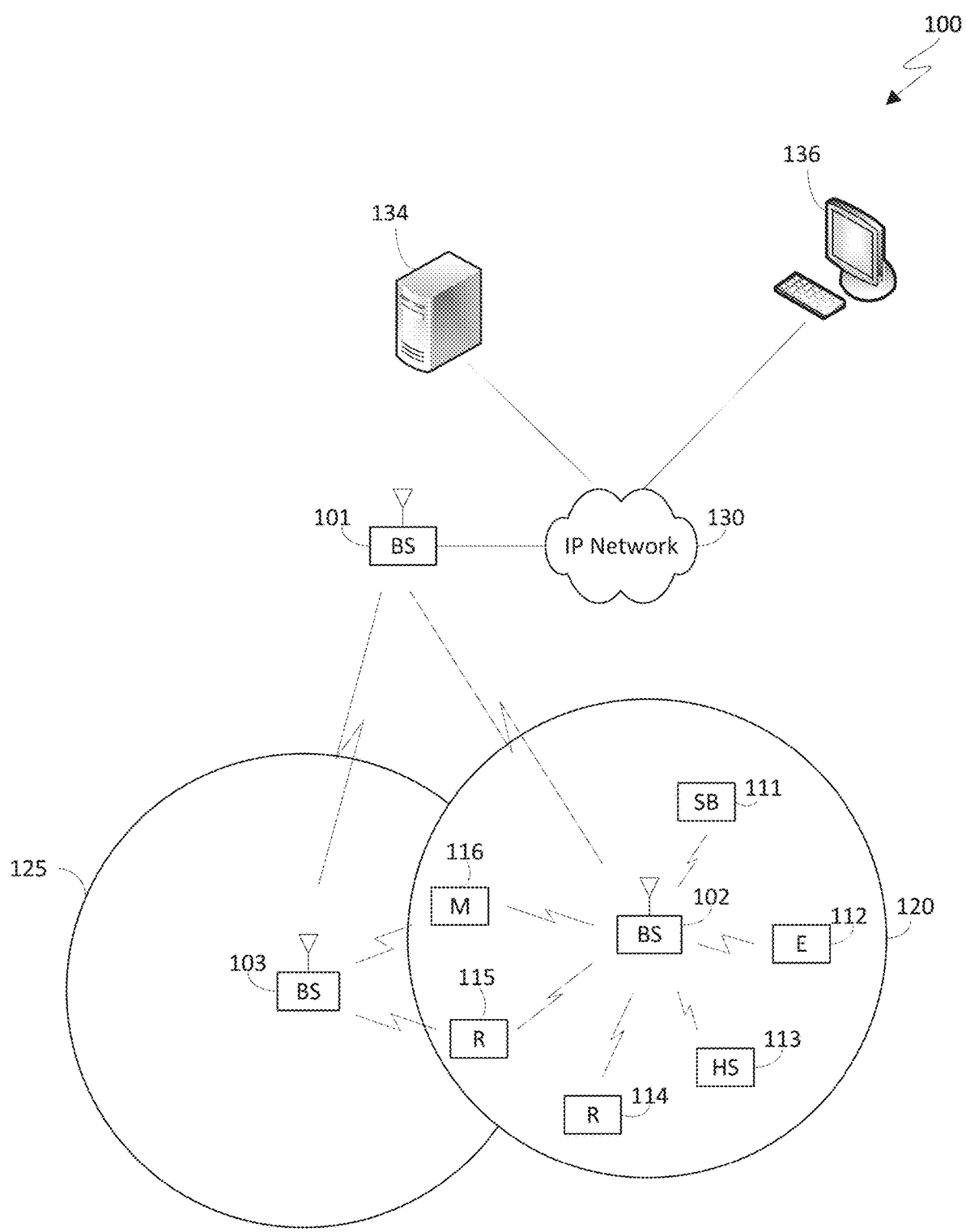
FIG. 1 illustrates an example wireless network according to various embodiments of the present disclosure.

FIG. 1 through FIG. 13, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and non-limiting embodiments of the present disclosure may be utilized in connection with any frequency band. For example, aspects of the present disclosure may also be applied to deployment of 5G communication systems, 6G or even later releases which may use terahertz (THz) bands.

In 5G and other wireless systems composite beam operation is often employed. Embodiments of the present disclosure recognize that one approach to reduce the number of SSB beams is to implement a composite beam system, where the BS transmits two narrow beams simultaneously for one SSB (same SSB index), and thereby halving the number of SSBs for the network. For example, in certain systems a BS may use two arrays to transmit the two narrow beams at the same time (one array for one narrow beam). Various embodiments of the present disclosure recognize that, in composite beam operation, two arrays may be used to transmit two narrow beams for a single SSB index. Therefore, the form factor of the BS is large. The large form factor may raise the cost of a BS and increase the deployment difficulties as well.

Accordingly, various embodiments of the present disclosure relate generating a composite beam codebook with a small factor BS. The methods use input information including the array setup, for example, antenna spacing and array size. Although mmWave bands are used as example in this disclosure, the embodiments in this disclosure can also be applied to other frequency bands as well.

It is noted that a composite beam system can also be implemented with three (or more) narrow beams for a single SSB index. The term "narrow beam" is used here since a large antenna array which is a typical setup for 5G mmWave network deployment is capable of forming narrow beams; however, the embodiments in this disclosure can be applied to other composite beam systems with any beam width.

As discussed in greater detail below, various embodiments of the present disclosure provide for dividing a single array into multiple sub-arrays including at least a first sub-array of antennas and a second sub-array of antennas, wherein at least a first antenna in the first sub-array is between multiple antennas in the second sub-array along a first dimension and at least a second antenna in the second sub-array is between multiple antennas in the first sub-array along a second dimension, and wherein each sub-array generates a different beam.

Various embodiments of the present disclosure also provide for utilizing a concave utility function to generate a code book for a given coverage region of composite beam which includes two or more disjoint regions.

Various embodiments of the present disclosure also provide for a machine-learning approach to generate codebooks for the composite beam, given, for example, a narrow beam codebook and a hierarchical tree structure (which defines the association between the composite beams and NBs). As a result, the coverage region of each NB can be determined.

Before further addressing the methods and devices used to effectuate the solutions discussed herein, various embodiments are shown in FIGS. 1 through 5 below, which describe such various embodiments implemented in wireless communications systems and with the use of orthogonal frequency division multiplexing (OFDM) or orthogonal frequency division multiple access (OFDMA) communication techniques. The descriptions thereof are not meant to imply physical or architectural limitations to the manner in which different embodiments may be implemented. Different embodiments of the present disclosure may be implemented in any suitably arranged communications system.

FIG. 1 illustrates an example wireless network according to various embodiments of the present disclosure. The non-limiting embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 can also communicate with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

As described in more detail below, one or more of gNB 101, gNB 102 and gNB 103 may determine and/or transmit composite beams generated based on machine learning as discussed herein.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

In some embodiments, the network 130 facilitates communications between at least one server 134 and various client devices, such as client device 136. Server 134 includes any suitable computing or processing device that can provide computing services for one or more client devices. Server 134 could, for example, include one or more processing devices, one or more memories storing instructions and data, and one or more network interfaces facilitating communication over the network 130.

Client device 136 represents any suitable computing or processing device that interacts with at least one server or other computing device(s) over the network 130. In this example, the client device is represented as a desktop computer, but other examples of client devices can include a mobile telephone, laptop computer, or tablet computer. However, any other or additional client devices could be used in the wireless network 100.

In this example, client devices can communicate indirectly with the network 130. For example, some client devices can communicate via one or more base stations, such as cellular base stations or eNodeBs. Also, client devices can communicate via one or more wireless access points (not shown), such as IEEE 802.11 wireless access points. Note that these are for illustration only and that each client device could communicate directly with the network 130 or indirectly with the network 130 via any suitable intermediate device(s) or network(s).

As described in more detail below, a computing device, such as server 134 or client device 136, may determine and/or generate codebooks and/or beamforming weights for transmission of composite beams based on machine learning as discussed herein. For example, the server 134 or client device 136 may generate and disseminate codebooks or elements thereof for composite beams based on machine learning offline from communication in the network 100.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
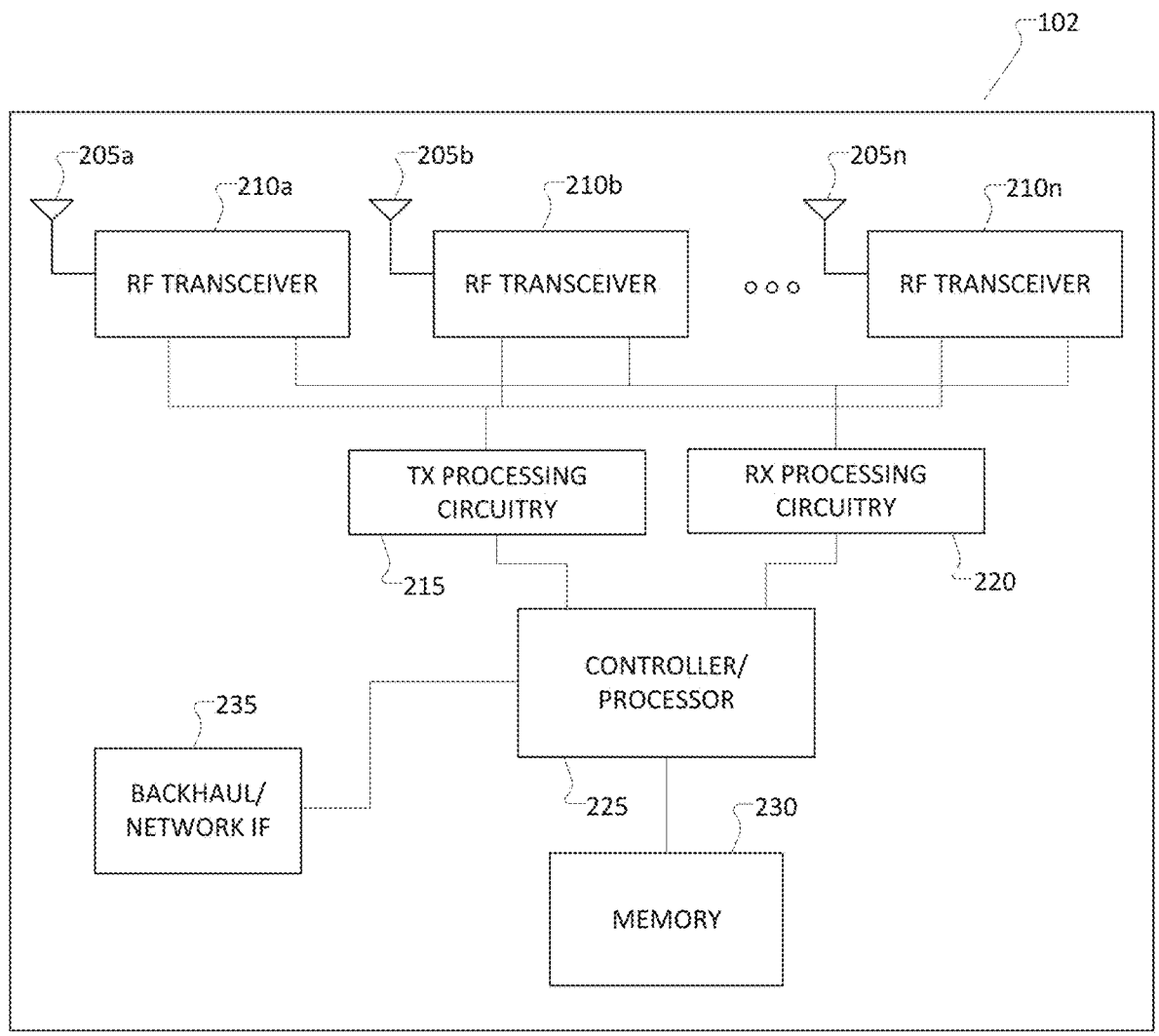
FIG. 2 illustrates an example base station (BS) according to various embodiments of the present disclosure.

FIG. 2 illustrates an exemplary base station example gNB 102 according to various embodiments of the present disclosure. The non-limiting embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As described in more detail below, the gNB 102 may determine and/or transmit composite beams generated based on machine learning as discussed herein. As shown in FIG. 2, the gNB 102 includes multiple antennas 205a-205n, multiple radio frequency (RF) transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate intermediate frequency (IF) or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform the method in part or in whole described herein, identify inputs, and create the codebook. Also, any of a wide variety of other functions can be supported in the gNB 102 by the controller/processor 225. In some embodiments, the controller/processor 225 includes at least one microprocessor or microcontroller.

In certain embodiments, the controller/processor 225 could support beam forming or directional routing operations in which outgoing signals from multiple antennas 205a-205n are weighted differently to effectively steer the outgoing signals in a desired direction and create and control narrow beans and/or composite beams. Any of a wide variety of other functions could be supported in the gNB 102 by the controller/processor 225.

The controller/processor 225 is also capable of executing programs and other processes resident in the memory 230, such as an operating system (OS). The controller/processor 225 can move data into or out of the memory 230 as used by an executing process. The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other read only memory (ROM).

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
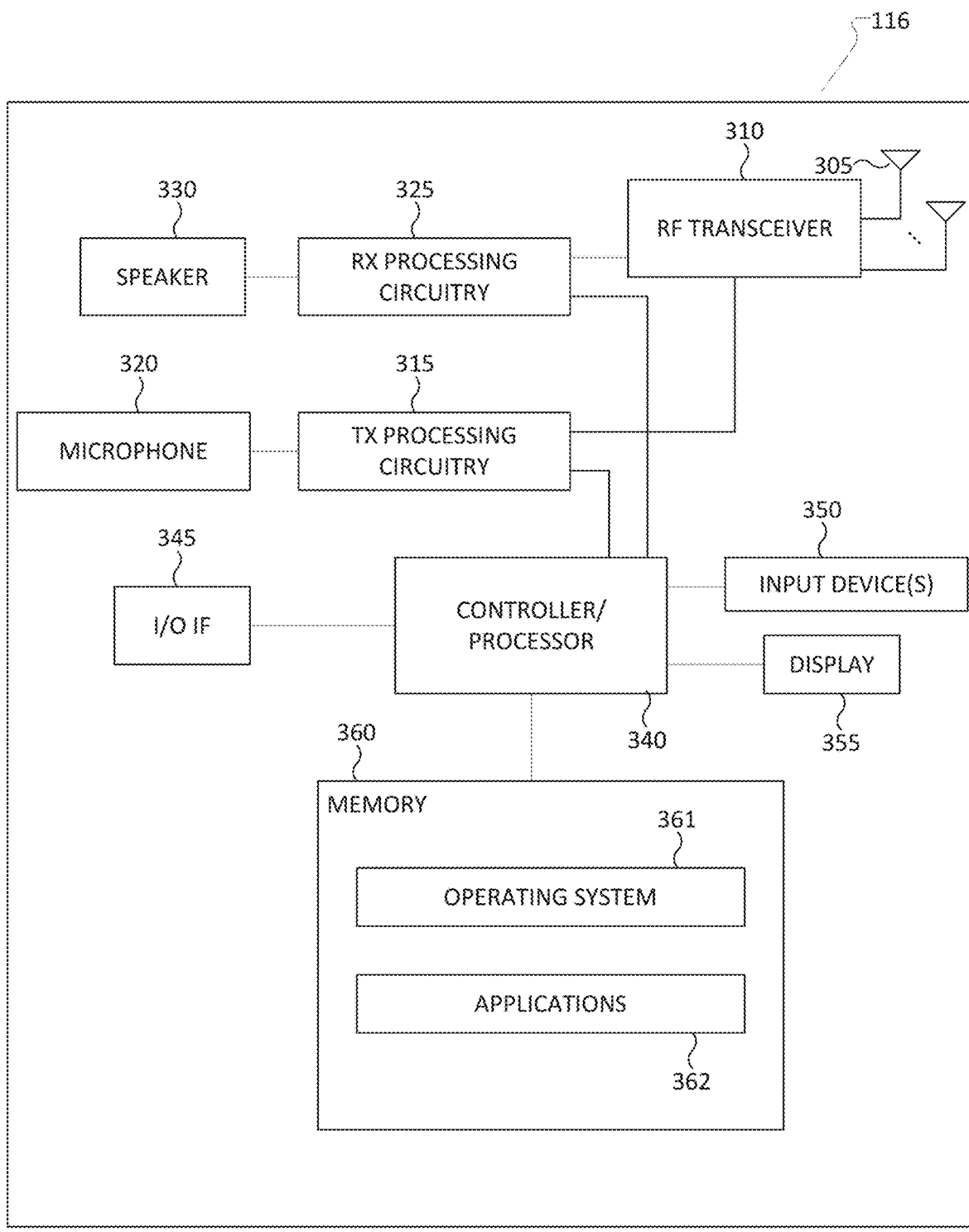
FIG. 3 illustrates an example user equipment (UE) according to various embodiments of the present disclosure.

FIG. 3 illustrates an example UE 116 according to various embodiments of the present disclosure. The non-limiting embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

For example, as discussed in greater detail below, the UE 116 may receive NBs and/or composite beams and transmit feedback based thereon, where the composite beams are generated based on machine learning as described in various embodiments of the present disclosure.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a controller/processor 340, an input/output (I/O) interface (IF) 345, a touchscreen 350 (or keypad), a display 355, and a memory 360. The memory 360 includes an operating system (OS) 361 and one or more applications 362.

The RF transceiver 310 receives from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the controller/processor 340 for further processing (such as for web browsing data).

The TX processing circuitry 315 receives analog or digital voice data from the microphone 320 or other outgoing baseband data (such as web data, e-mail, or interactive video game data) from the controller/processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The controller/processor 340 can include one or more processors or other processing devices and execute the OS 361 stored in the memory 360 in order to control the overall operation of the UE 116. For example, the controller/processor 340 could control the reception of forward channel signals and the transmission of reverse channel signals by the RF transceiver 310, the RX processing circuitry 325, and the TX processing circuitry 315 in accordance with well-known principles. In some embodiments, the controller/processor 340 includes at least one microprocessor or microcontroller.

The controller/processor 340 is also capable of executing other processes and programs resident in the memory 360. The controller/processor 340 can move data into or out of the memory 360 as used by an executing process. In some embodiments, the controller/processor 340 is configured to execute the applications 362 based on the OS 361 or in response to signals received from gNBs or an operator. The controller/processor 340 is also coupled to the I/O interface 345, which provides the UE 116 with the ability to connect to other devices, such as laptop computers and handheld computers. The I/O interface 345 is the communication path between these accessories and the controller/processor 340.

The controller/processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the controller/processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the controller/processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
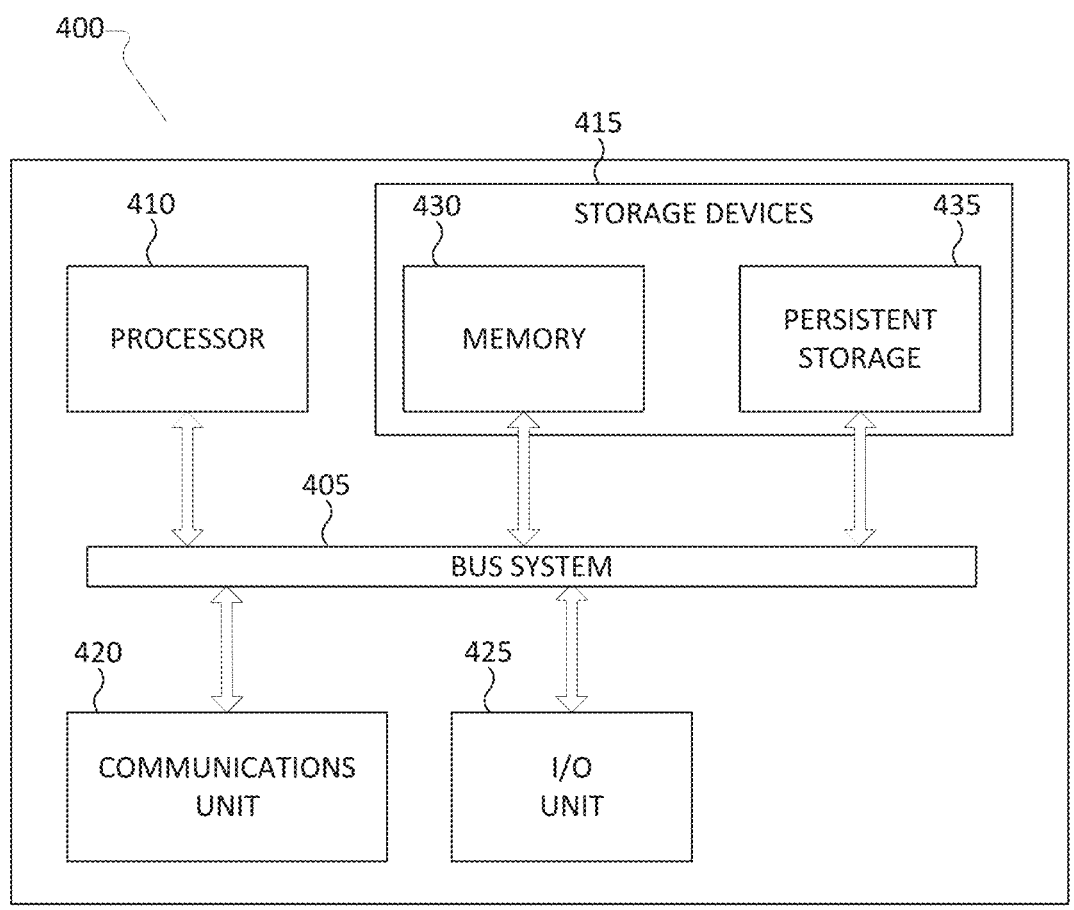
FIG. 4 illustrates a diagram of a computing device according to various embodiments of the present disclosure.

FIG. 4 illustrates an example of a computing device 400 in accordance with various embodiments of this disclosure. In one embodiment, the computing device 400 is a server, such as server 134 in FIG. 1 or a client device, such as client device 136 in FIG. 1. The computing device 400 is for illustration only and other embodiments can be used without departing from the scope of the present disclosure.

As described in more detail below, a computing device 400 may determine and/or generate codebooks and/or beamforming weights for transmission of composite beams based on machine learning as discussed herein. For example, the computing device 400 may generate and disseminate codebooks or elements thereof for composite beams based on machine learning offline from communication in the network 100. As shown in FIG. 4, the computing device 400 includes a bus system 405, which supports communication between at least one processor 410, at least one storage device 415, at least one communications unit 420, and at least one input/output (I/O) unit 425. The processor 410 executes instructions that may be loaded into a memory 430. The processor 410 may include any suitable number(s) and type(s) of processors or other devices in any suitable arrangement. Examples of types of processor 410 include microprocessors, microcontrollers, digital signal processors, field programmable gate arrays, application specific integrated circuits, and discreet circuitry.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random-access memory or any other suitable volatile or non-volatile storage device(s). The persistent storage 435 may contain one or more components or devices supporting longer-term storage of data, such as a ready only memory, hard drive, flash memory, or optical disc.

The communications unit 420 supports communications with other systems or devices. For example, the communications unit 420 could include a network interface card or a wireless transceiver facilitating communications over the network 130. The communications unit 420 may support communications through any suitable physical or wireless communication link(s).

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

Note that while FIG. 4 is described as representing the server 134 of FIG. 1, the same or similar structure could be used in one or more client devices. For example, client device 136 can have the same or similar structure as shown in FIG. 4.

Figure 5:
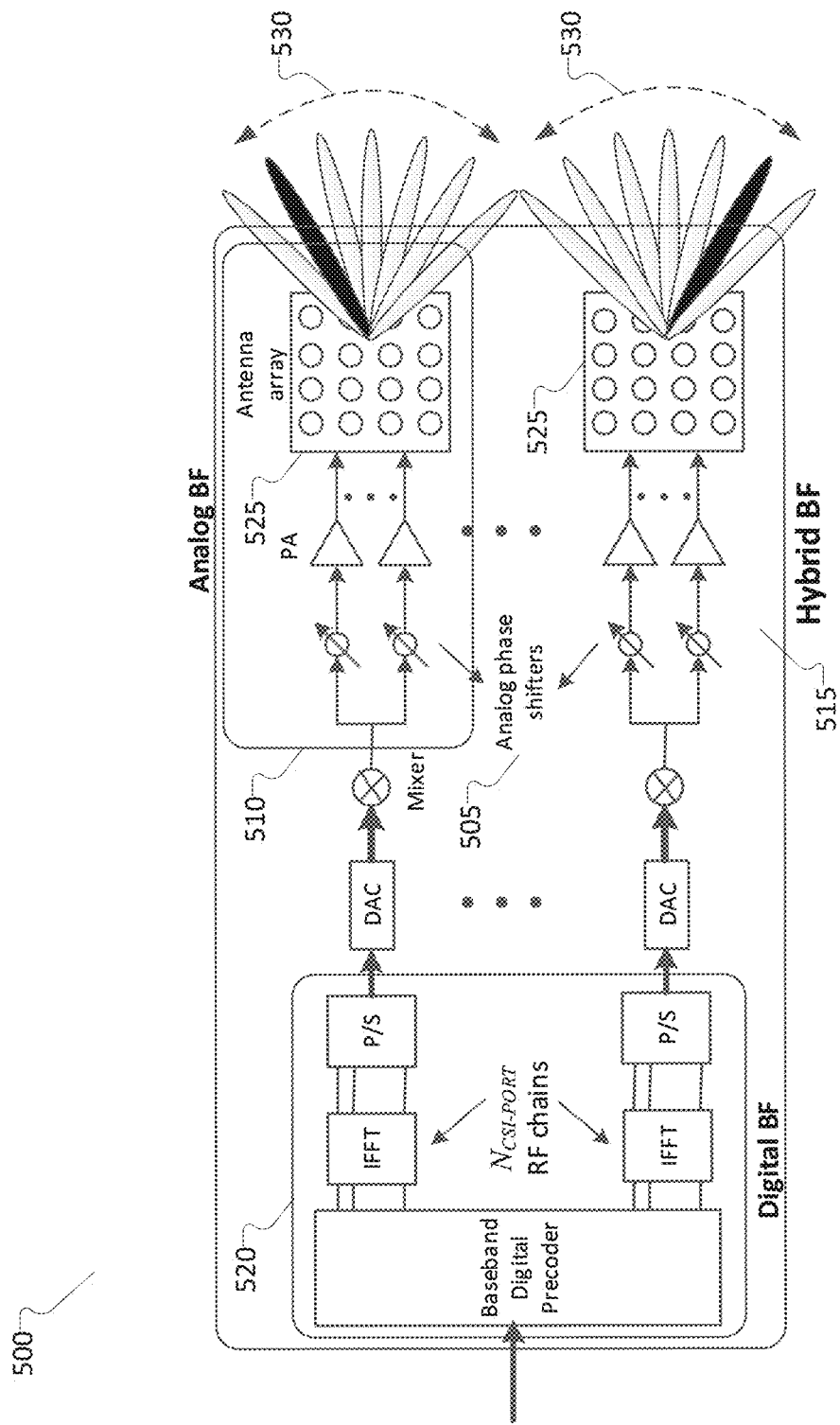
FIG. 5 illustrates an example of a transmitter structure for beamforming according to various embodiments of the present disclosure.

FIG. 5 illustrates an example of a transmitter structure 500 for beamforming according to various embodiments of the present disclosure. The non-limiting embodiment of the transmitter structure 500 illustrated in FIG. 5 is for illustration only. FIG. 5 does not limit the scope of this disclosure to any particular implementation of the transmitter structure 500. In certain embodiments, one or more of gNB 102 or UE 116 include the transmitter structure 500. For example, one or more of antenna 205 and its associated systems or antenna 305 and its associated systems can be included in transmitter structure 500.

In the example shown in FIG. 5, the transmitter structure 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports NCSI-PORT. A digital BF 515 performs a linear combination across NCSI-PORT analog beams to further increase precoding gain. While analog beams are wideband (hence not frequency-selective), digital precoding can be varied across frequency sub-bands or resource blocks.

In various embodiments, the transmitter structure 500 may be located in a BS, such as gNB 102, and may transmit composite beams generated based on machine learning using a single antenna array 525.

As operating frequency bands in NR become higher, the UE may include a plurality of antenna arrays 525 or panels (each panel is able to transmit via one analog beam, e.g., analog BF 510) to enhance aspects of multi-beam operation such as coverage enhancement, beam failure event minimization, fast beam switching, and the like. By utilizing the capability of multiple panels, UE 116 is able to obtain a variety of diversity gains, which comes from dynamic selection of panel(s) with the predicted quality in terms of performance that systems want to optimize.

As an example, a beam corresponds to a spatial transmission/reception filter that is used by the UE 116 and/or gNB 102. In one example, a beam can correspond to a spatial reception filter that is used by the UE 116 to receive a signal, such as SSB (or SS/PBCH block) and/or a CSI-RS and so on. In another example, a beam can correspond to a spatial transmission filter that is used by the UE 116 to transmit a reference signal, such as an UL sounding reference signal (SRS) and so on.

A beam reporting procedure for a UE can include, for example, a procedure wherein the gNB 102 configures the UE 116 with a set of reference signal (RS) resources, such as CSI-RS resources, as well as a configuration for report settings, such that the UE can generate and send UE reports including information indicating beam quality metric(s) measurement(s), such as channel state information (CSI), reference signal received power (RSRP), reference signal received quality (RSRQ), received signal strength indicator (RSSI), signal to noise ratio (SNR), signal to interference and noise ratio (SINR), and so on, as well as information about beam locations, such as, beam pattern, pointing angle of individual beams, etc. In one example, a gNB 102 can transmit a RS, such as a SSB or a CSI-RS or an SRS with a number of repetitions using a same spatial transmission filter in multiple occasions, so that the gNB 102 and/or UE 116, respectively, can receive the RS with different spatial reception filters, in order to facilitate beam sweeping and identification of a candidate/predicted beam based on a quality metric, such as RSRP or SINR.

Figure 6:
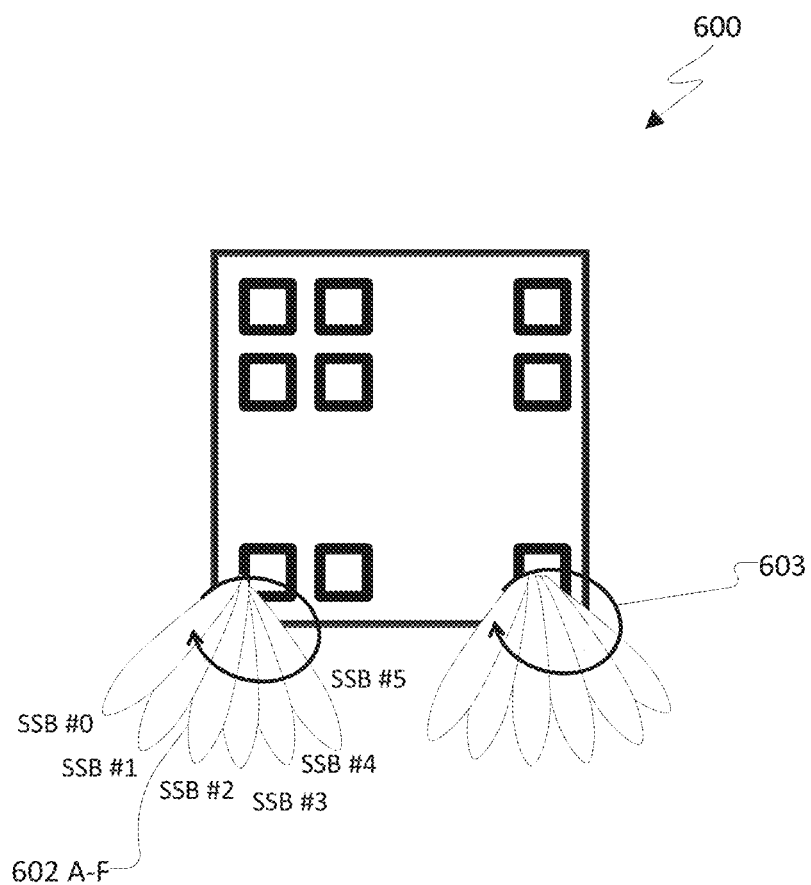
FIG. 6 illustrates an example of a composite beam transmission using a single array according to various embodiments of the present disclosure.

FIG. 6 illustrates an example of a composite beam transmission using a single antenna array 600 according to various embodiments of the present disclosure. The antenna array 600 is for illustration only and other embodiments can be used without departing from the scope of the present disclosure.

In one embodiment, the antenna array 600, for example, of BS 102, used (at least) a single array to transmit two NBs of a composite beam at the same time. In this example, the composite beam, which has multiple main lobes (e.g., for the NBs), is radiated by a single array 600, instead of multiple arrays. 602A-602F represent individual SSBs (SSB #0-5), associated with the single array in a clockwise direction, where first and second SSBs 602 and 603 are transmitted simultaneously via a composite beam using the single array 600.

Embodiments of the present disclosure provide multiple methods to generate the multi-lobe beams. In one embodiment, the single array is divided into multiple sub-arrays, and each sub-array generates a different beam. For example, if there are two NBs per composite beam, the antenna elements in the antenna array could be divided horizontally, vertically, or mixed. Antenna array division is not limited in this context, it can be divided in various other ways, for example, diagonally, spherically, or interwoven.

Figure 7A:
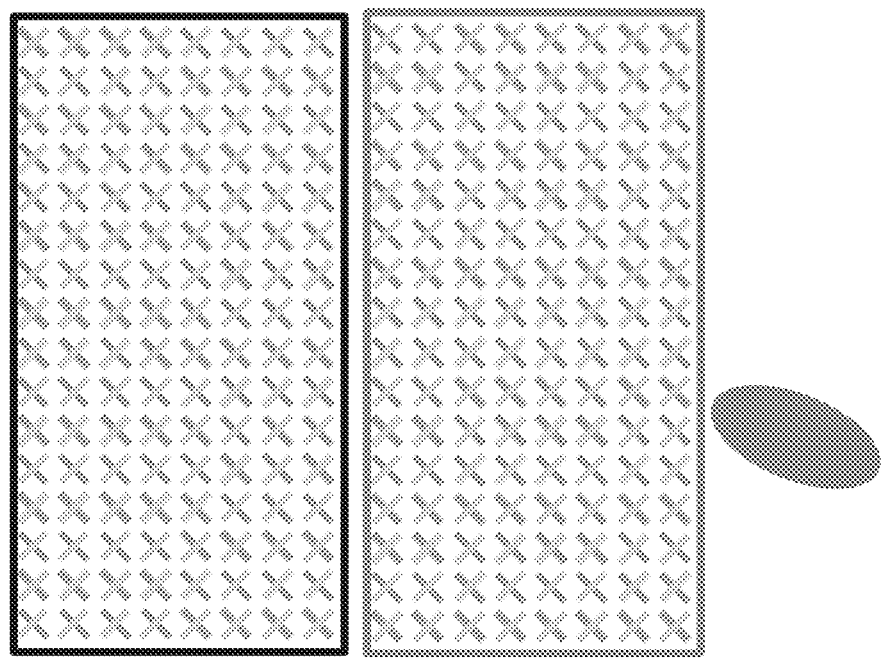
FIGS. 7A and 7B illustrate examples of dividing a single array into two sub-arrays according to embodiments of the present disclosure.
Figure 7B:
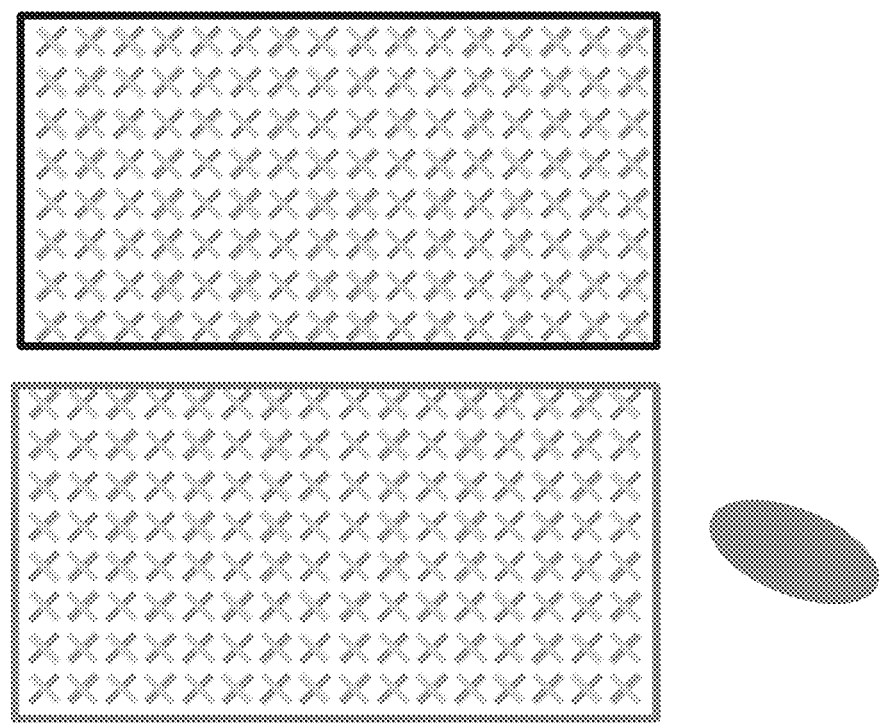
Figure 7C:
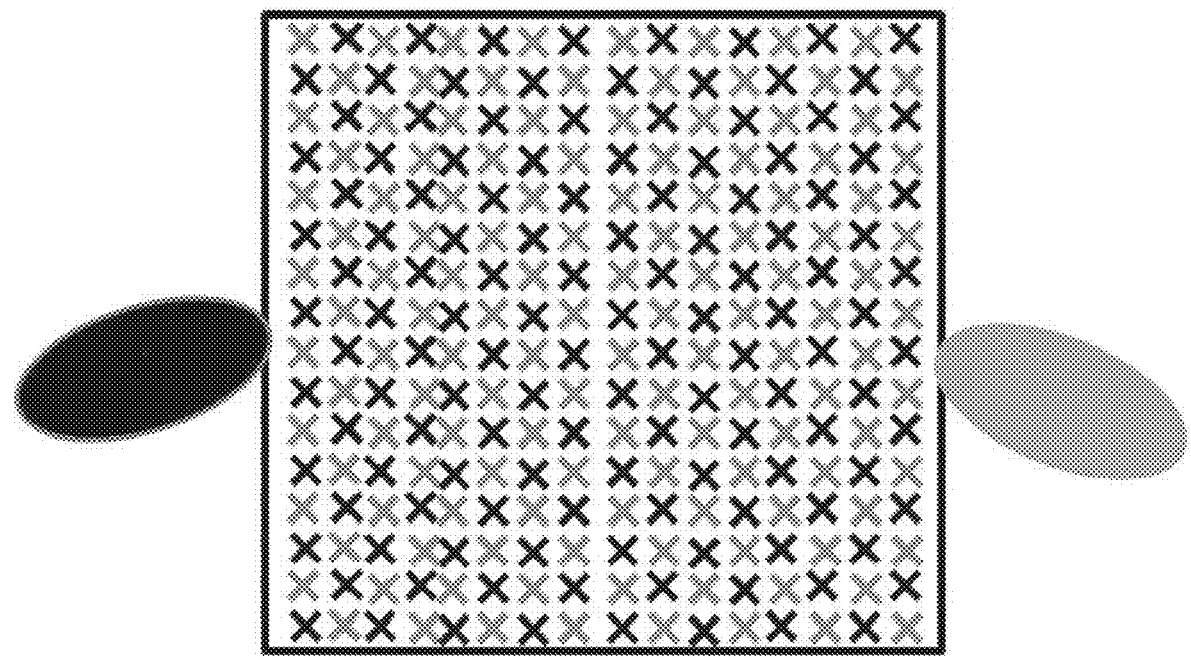
FIG. 7C illustrates an example of dividing a single array into two sub-arrays using interleaved antenna elements according to various embodiments of the present disclosure.

FIGS. 7A and 7B illustrate examples of dividing a single array into two sub-arrays according to embodiments of the present disclosure. FIG. 7C illustrates an example of dividing a single array into two sub-arrays using interleaved antenna elements according to various embodiments of the present disclosure. The examples illustrated in FIGS. 7A-7C are for illustration only and other embodiments can be used without departing from the scope of the present disclosure.

FIGS. 7A and 7B illustrate two examples of ways to divide a 16×16 planar array into two half-arrays. Although division of the 16×16 planar array is divided into two half-arrays in the present disclosure, the non-limiting embodiments in this disclosure can also be applied to include other divisional proportions and planar arrangements. In one embodiment, the two sub-arrays generate two beams pointing to different directions. The partition could be chosen based on the desired beam shape. Alternatively or additionally, the partition could be chosen based on the desired beam search accuracy. In one embodiment using vertical partition, the two wide half-arrays generate two main lobes that are narrow in the horizontal direction but wide in the vertical direction.

In another embodiment using horizontal partition, the two tall half-arrays generate a composite beam with two main lobes that are wide in the horizontal direction but narrow in the vertical direction.

FIG. 7C illustrates another example to divide a 16×16 planar array into two-square sub-arrays using a mixed or interleaved partition. Here, the darker colored antenna elements of the array are fed to generate a first beam or main lobe of the composite beam and the lighter colored antenna elements of the array are fed to generate a second beam or main lobe of the composite beam. In this example, using an interleaved partition, the two square half-arrays generate two main lobes having two square-shaped main lobes. The beam search accuracy refers to the probability that the predicted NB is found by first finding the predicted composited and then searching among its children NBs. The mixed partition is disclosed to attain the predicted beam search accuracy.

In another embodiment, given the coverage region of composite beams which includes two or more disjointed regions, a concave utility function method is used to generate the composite beam. In this embodiment, samples the angular directions are sampled from the required coverage region. For example, assuming that the array response at the direction is $a(\theta,\phi)$, and the beamforming weights of the composite beam are w, the beam gain pattern is $P(\theta,\phi)=p(\theta,\phi)w^H a(\theta,\phi)a(\theta,\phi)^H w$.

In one embodiment, the beam is designed to increase or maximize the sum of a concave utility of the beamforming gain, for example, using the formula:

$$\max_{w} \sum_{(\theta,\phi)\in C} f\left(p(\theta,\phi)w^H a(\theta,\phi)a(\theta,\phi)^H w\right)$$

Here, C is the angular coverage region of a composite beam which includes two or more disjoint regions; $a(\theta,\phi)$ is the array response; $p(\theta,\phi)$ is the antenna element pattern; $f(x)$ is a non-decreasing concave utility function.

In these embodiments, the utility function is a non-decreasing concave function. In one example, the utility function $f(x)$ could be set as $\log(x)$. Gradient descent algorithm could be adopted to find a local optimal w that maximizes the utility function. Although the utility function may be a non-decreasing concave function, other forms can be applied to the present disclosure, for example, an increase or decrease in the concavity can be applied.

Figure 8A:
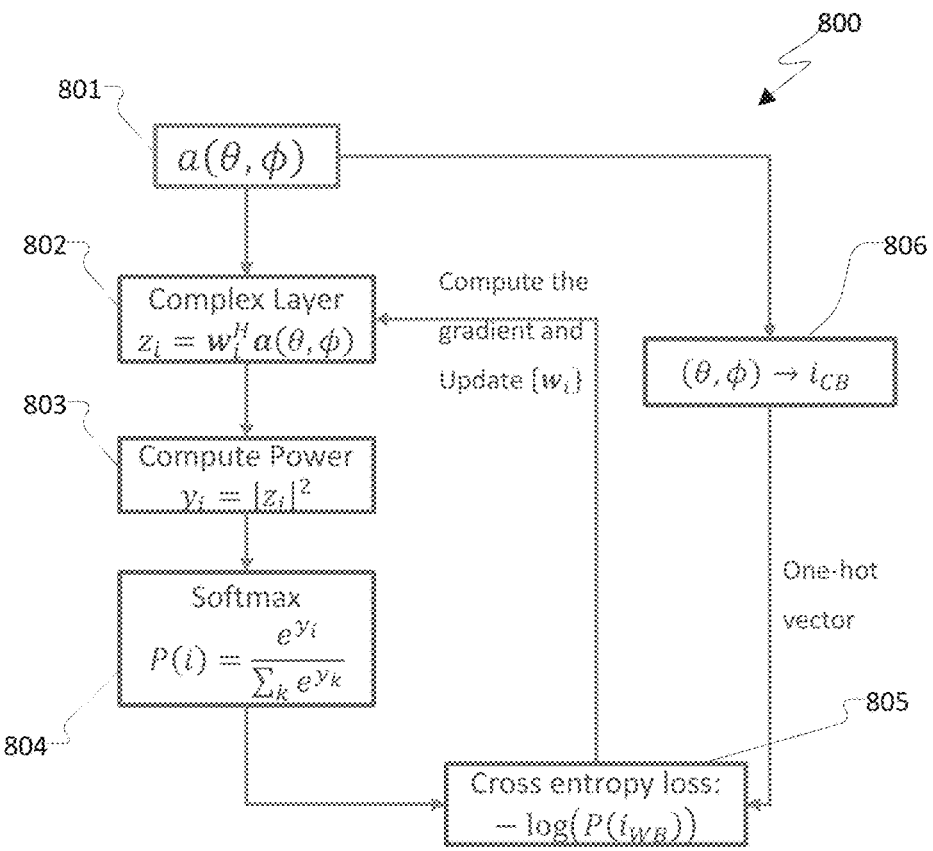
FIG. 8A illustrates an example of a flowchart for a machine learning model for generating composite beams according to embodiments of the present disclosure.
Figure 8B:
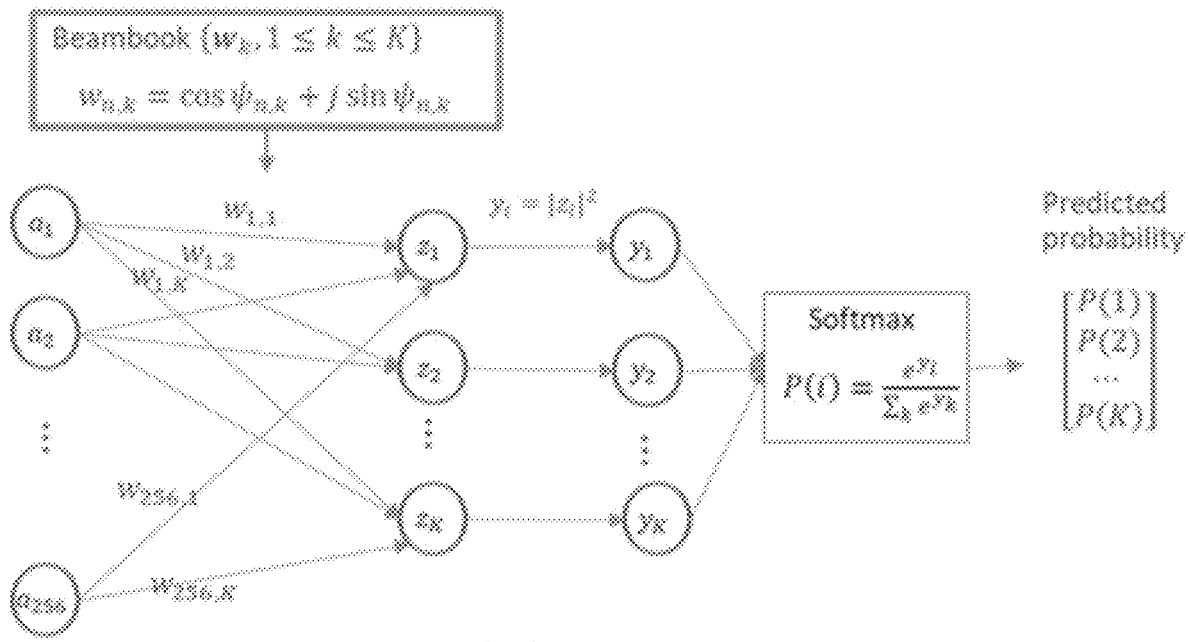
FIG. 8B illustrates an example of an artificial neural network (ANN) for the machine learning model of FIG. 8A for identifying beamforming weights for composite beams according to embodiments of the present disclosure.

FIG. 8A illustrates an example of a flowchart for a machine learning model 800 for generating composite beams according to embodiments of the present disclosure. FIG. 8B illustrates an example of an ANN for the machine learning model of FIG. 8A for identifying beamforming weights for composite beams according to embodiments of the present disclosure. For example, the model 800 may be implemented by a computing device, such as computing device 400 or a base station, such as BS 102 individually and collectively referred to here as "the system." The example model 800 and ANN are for illustration only and other embodiments can be used without departing from the scope of the present disclosure. For example, FIG. 8A illustrates an example of a model 800 for a machine learning based hierarchical accuracy enhancement in the angular domain. Although examples used in this disclosure use angular domain, other domains can be applied as well, such as a frequency domain or time domain.

In various embodiments, a machine-learning based method is used to generate the composite beams. In these embodiments, the NB codebook and the hierarchical tree structure (which defines the association between the composite beams and NBs) is utilized to determine an associated between the composite beams and NBs. As a result, the coverage region of each NB can be determined. To have a high beam search accuracy, the coverage region of the composite beam is matched the union of its children coverage regions. For example, this may be expressed similarly to the classification formula, shown below, which classifies the angular regions with composite beam index.

To generate a composite beam, system first the identifies the coverage region (which includes two or more sub regions) of the composite beams. The coverage region may be given. For example, the coverage region may be determined according to U.S. patent application Ser. No. 17/810,246 filed Jun. 30, 2022.

The input $a(\theta,\phi)$ (at block 801) is the array response sampled from the angular coverage region. The array response vector may be a steering vector for beamforming. The array response vector represents the set of phase delays a plane wave experiences, evaluated at a set of array elements. The phases are specified with respect to an arbitrary origin.

Thereafter, the system trains a machine learning algorithm, for example, including an ANN as illustrated in FIG. 8B with training samples. For example, the training samples may be pairs including the arrays response vector at the sampled direction and one-hot encoding of the desired composite beam index. One-hot encoding is way to encode the of the composite beam index. For example, if there are a total of K composite beam. Then the hot-hot encoding of the first composite beam is [1, 0, 0, 0, ..., 0], the encoding of the 2nd composite beam is [0, 1, 0, 0, 0], ..., the one-hot encoding of the Kth composite beam is [0, 0, 0, ..., 0, 1].

In this example, the input of the ANN is the array response vector, the parameters of the first hidden layer (or the complex layer at block 802) of the ANN are the beamforming weights, and the output layer is the probability of the composite beam. In this example, the structure of the neural network is as follows: [a_1, a_2, ... a_256] is the array response vector, which is feed into the neural network. As illustrated in FIG. 8B, in the first hidden layer which is between a and z, the parameters w are the beamforming weights. System computes the output power y using z (at block 803) and then uses a softmax function (at block 804) to generate a predicted probability P(1), P(2), ... P(K), which is the probability of composite beam predicted by the ANN.

The mapping of $(\theta,\phi) \to i_{CB}$ (at block 806) is a mapping from angle of departure to composite beam or WB index. The mapping is obtained according to the NB coverage regions and the hierarchical tree structure. The cross-entropy loss is to be reduced or minimized (at block 805). For example, the softmax function and cross-entropy loss can be used in the machine learning classification formula. Mathematically, the formula is as follows:

$$\max_{\{w_i\}} \sum_{(\theta,\phi)} \log\left(\frac{e^{|w_{i(\theta,\phi)}^H a(\theta,\phi)|^2}}{\sum_{k=1}^{K} e^{|w_k^H a(\theta,\phi)|^2}}\right) \text{ s.t., } |w_{ji}| = \text{constant}, 1 \le j \le 256, 1 \le i \le K$$

Here, K is the number of composite beams, $w_{ji}$ is the j-th element of the i-th composite beam, $i(\theta,\phi)$ is the desired WB index of the sampled direction $(\theta,\phi)$, $$P(i(\theta, \phi)) = \frac{e^{|w_{i(\theta,\phi)}^H a(\theta,\phi)|^2}}{\sum_{k=1}^{K} e^{|w_k^H a(\theta,\phi)|^2}}$$

is the predicted probability that $i(\theta, \phi)$ is the best beam at the direction $(\theta,\phi)$.

The predicted probability is compared with the desired output, which is the one-hot encoding of the desired composite beam. The difference between these two K×1 vectors is measured by a metric called cross entropy loss. Through training, the system iteratively updates the parameters in the ANN (which are w) to further reduce or minimize the cross-entropy loss. Upon convergence of the machine learning algorithm after iterating, the system extracts the parameters w of the first hidden layer of the ANN as the beamforming weights for the composite beam. Here, system may train the model 800 for each of a plurality of composite beams and directions and encode the determined beamforming weights in a composite beam codebook for use in the network 101.

In one embodiment, a machine learning framework, for example, TensorFlow, PyTorch, can be used to perform the classification. Note that, for these examples, the phase is continuous. If the phase shifter has a limited resolution, the phase can be quantized in the end of the machine learning based method.

Figure 8C:
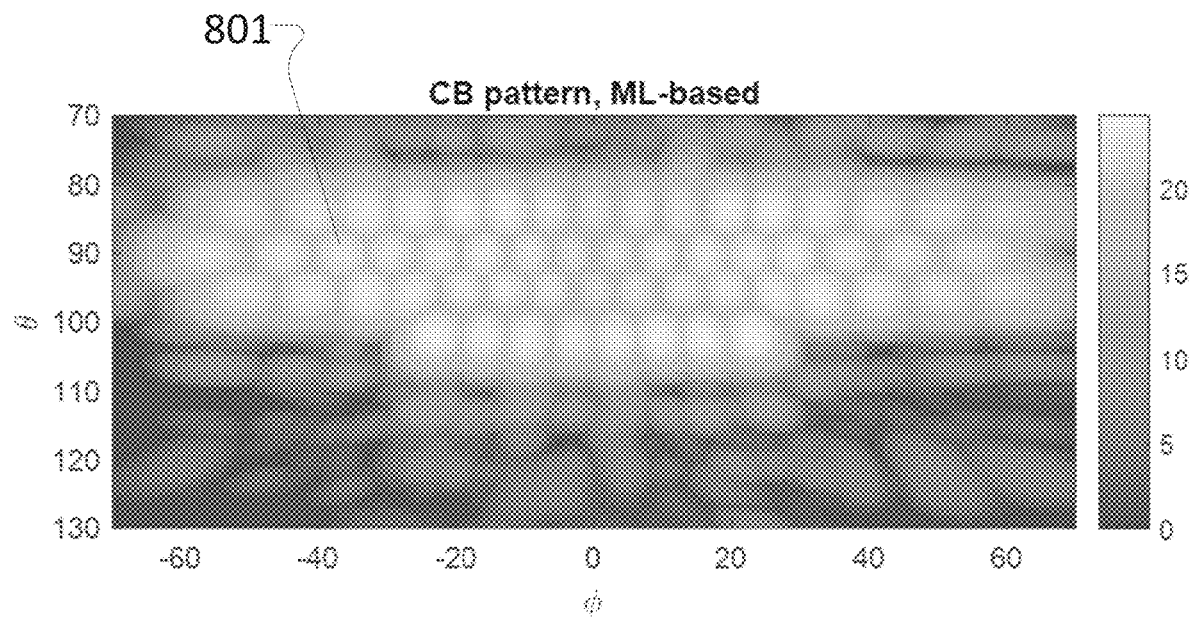
FIG. 8C illustrates an example of composite beam patterns according to various embodiments of the present disclosure.
Figure 8D:
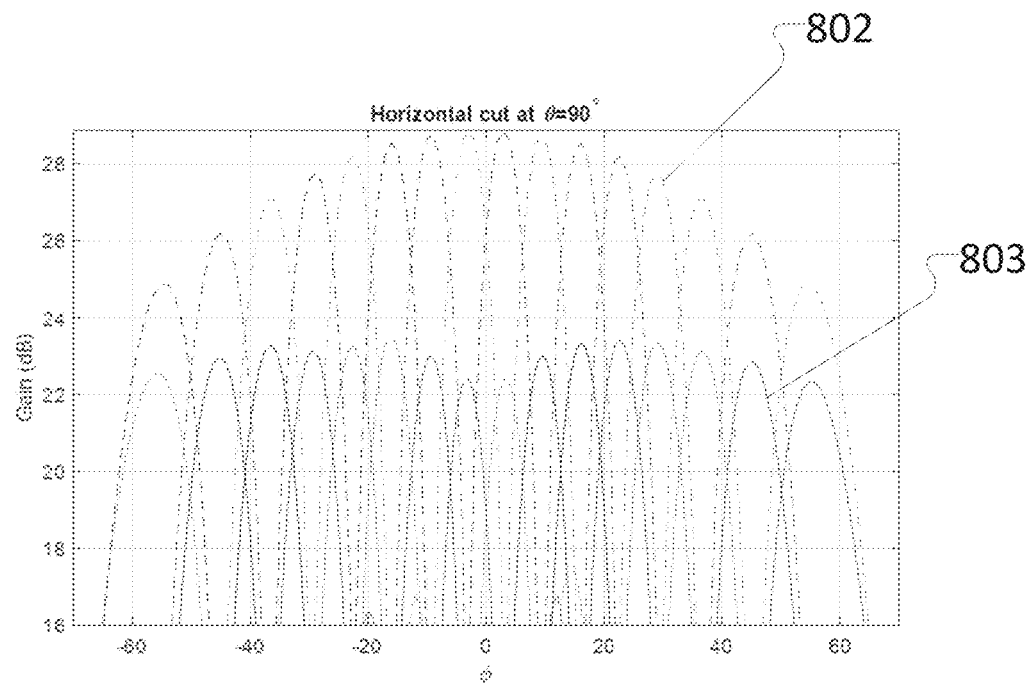
FIG. 8D illustrates an example of composite beam and narrow beam (NB) gain according to various embodiments of the present disclosure.
Figure 9A:
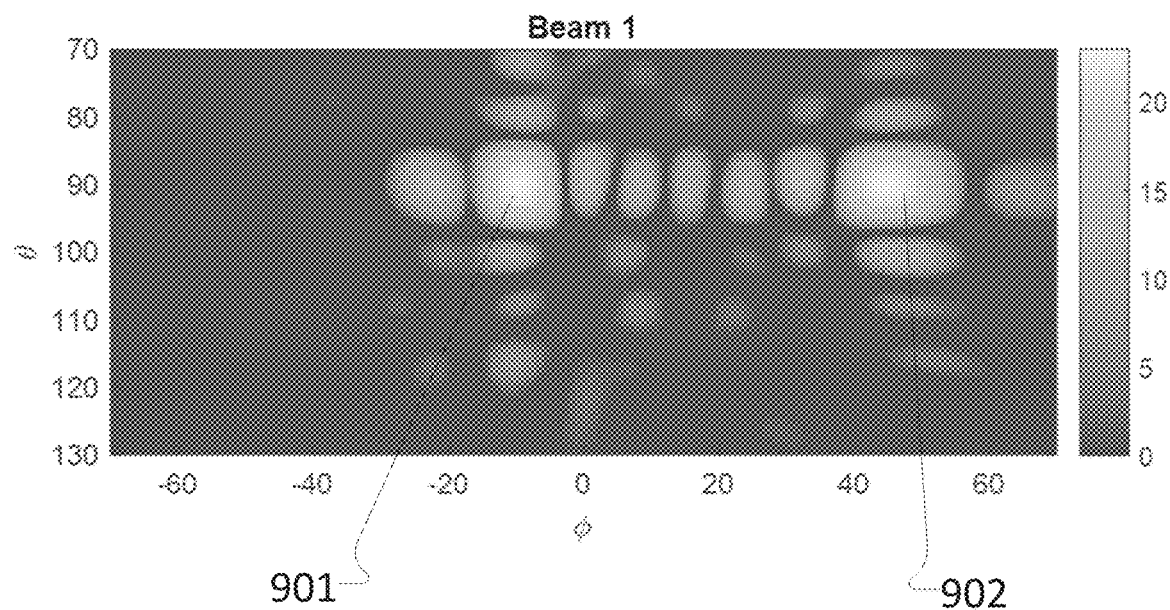
FIGS. 9A-9D illustrate examples of the composite beam patterns for various composite beams according to various embodiments of the present disclosure.
Figure 9B:
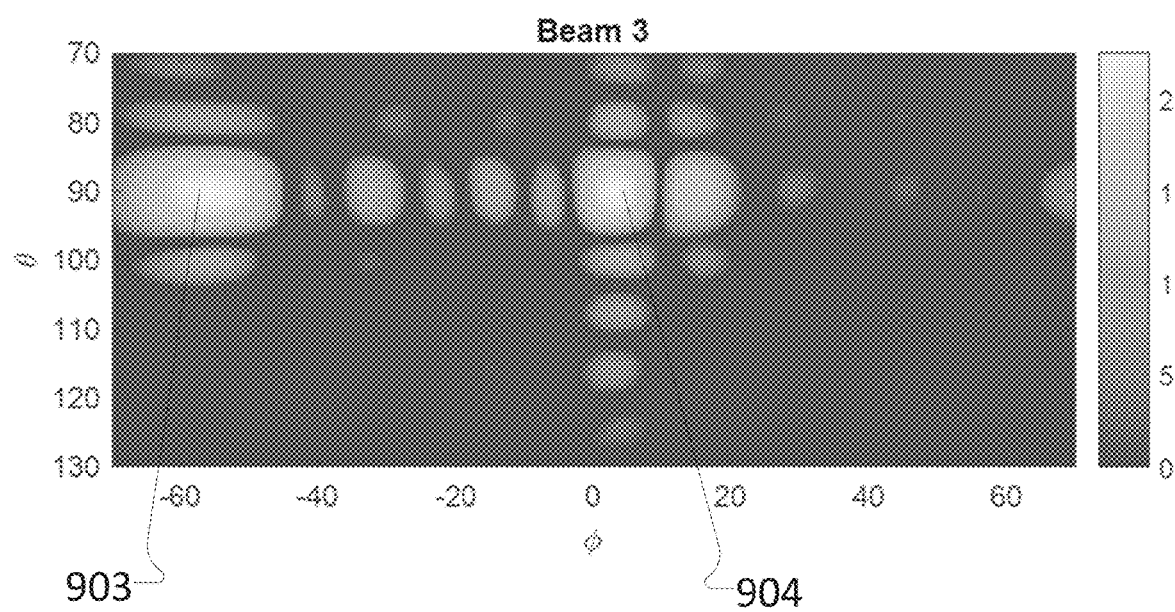
Figure 9C:
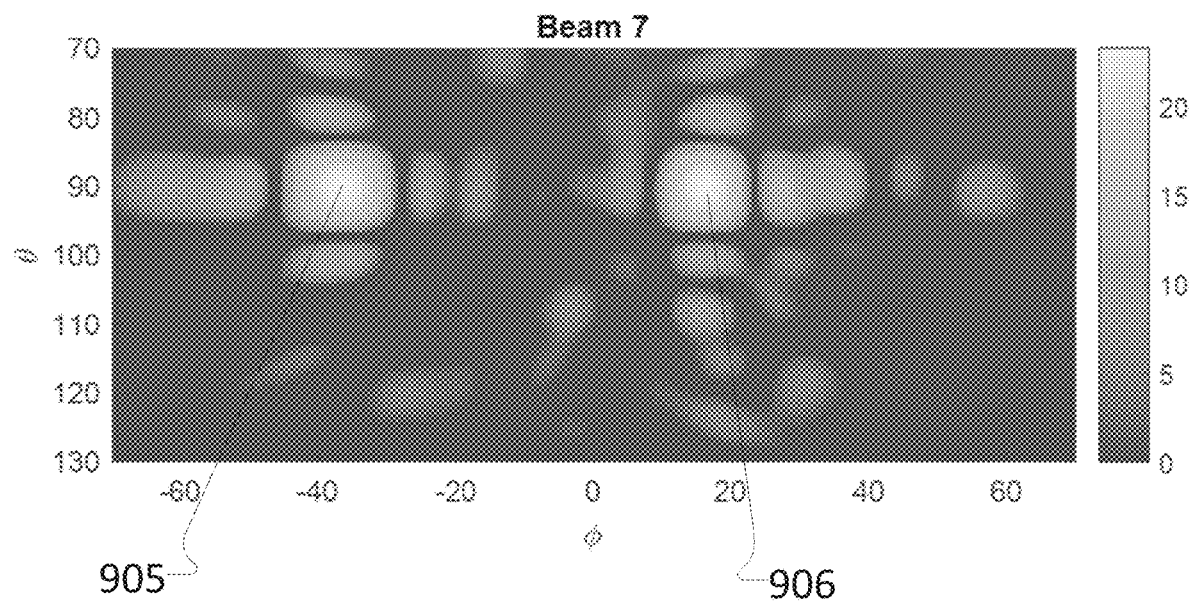
Figure 9D:
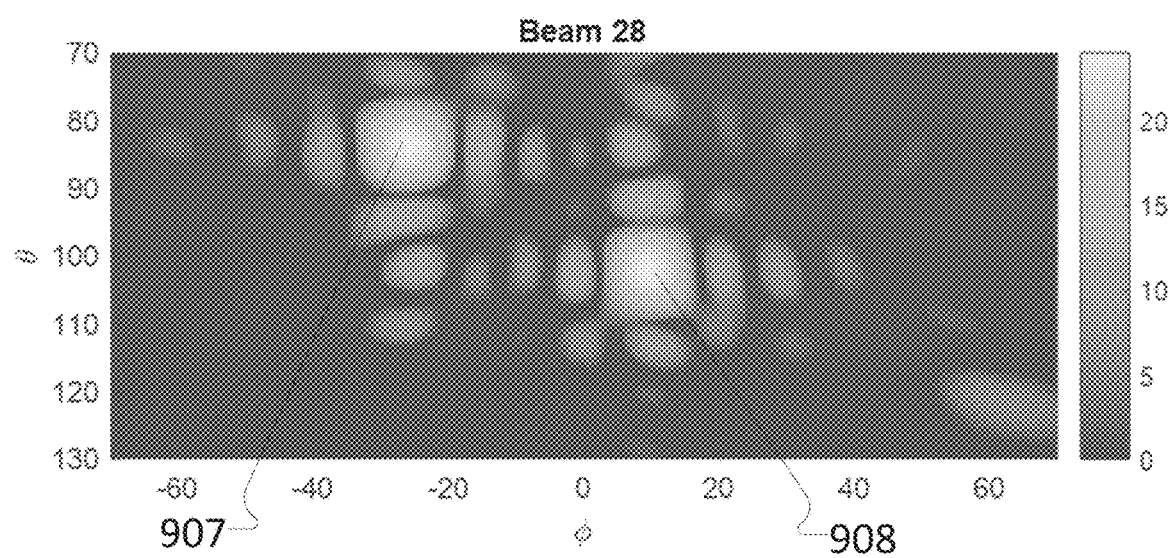

FIG. 8C illustrates an example of composite beam patterns according to various embodiments of the present disclosure. FIG. 8D illustrates an example of composite beam and narrow beam (NB) gain according to various embodiments of the present disclosure. The examples provided in FIGS. 8C and 8D are for illustration only and other embodiments can be used without departing from the scope of the present disclosure.

FIGS. 8C and 8D illustrate examples of composite beam generation according to machine learning methods disclosed herein. FIG. 8C illustrates an angular dimension response (e.g., as a function of energy gain) of a composite beam pattern, with beam 801 being an example NB that is paired with another NB to form a composite beam. FIG. 8D illustrates the gain response produced in the angular domain of an array of 16 NBs 802 compared with an array of 8 composite beams 803 in a one dimension cut (i.e., $\varphi$ at $\theta=90°$). As illustrated, the composite beam boundaries are shown to be well aligned with NB boundaries.

FIGS. 9A-9D illustrate examples of the composite beam patterns for various composite beams according to various embodiments of the present disclosure. The examples provided in FIGS. 9A-9D are for illustration only and other embodiments can be used without departing from the scope of the present disclosure.

FIGS. 9A-9D illustrate the energy gain response in the angular domain for different composite beams (e.g., composite beam 1, 3, 7, and 28, respectively) transmitted via a single antenna array using beamforming weights determined according to machine-learning embodiments described herein. In these examples, the composite beam has two main lobes (901 and 902 in FIG. 9A, 903 and 904 in FIG. 9B, 905 and 906 in FIG. 9C, and 907 and 908 in FIG. 9D) which are considered as two children NBs. The single array composite beam has a similar beam shape as the two-array composite beam, although it may have a lower gain than two-array composite beam because of the form factor reduction.

Figure 10:
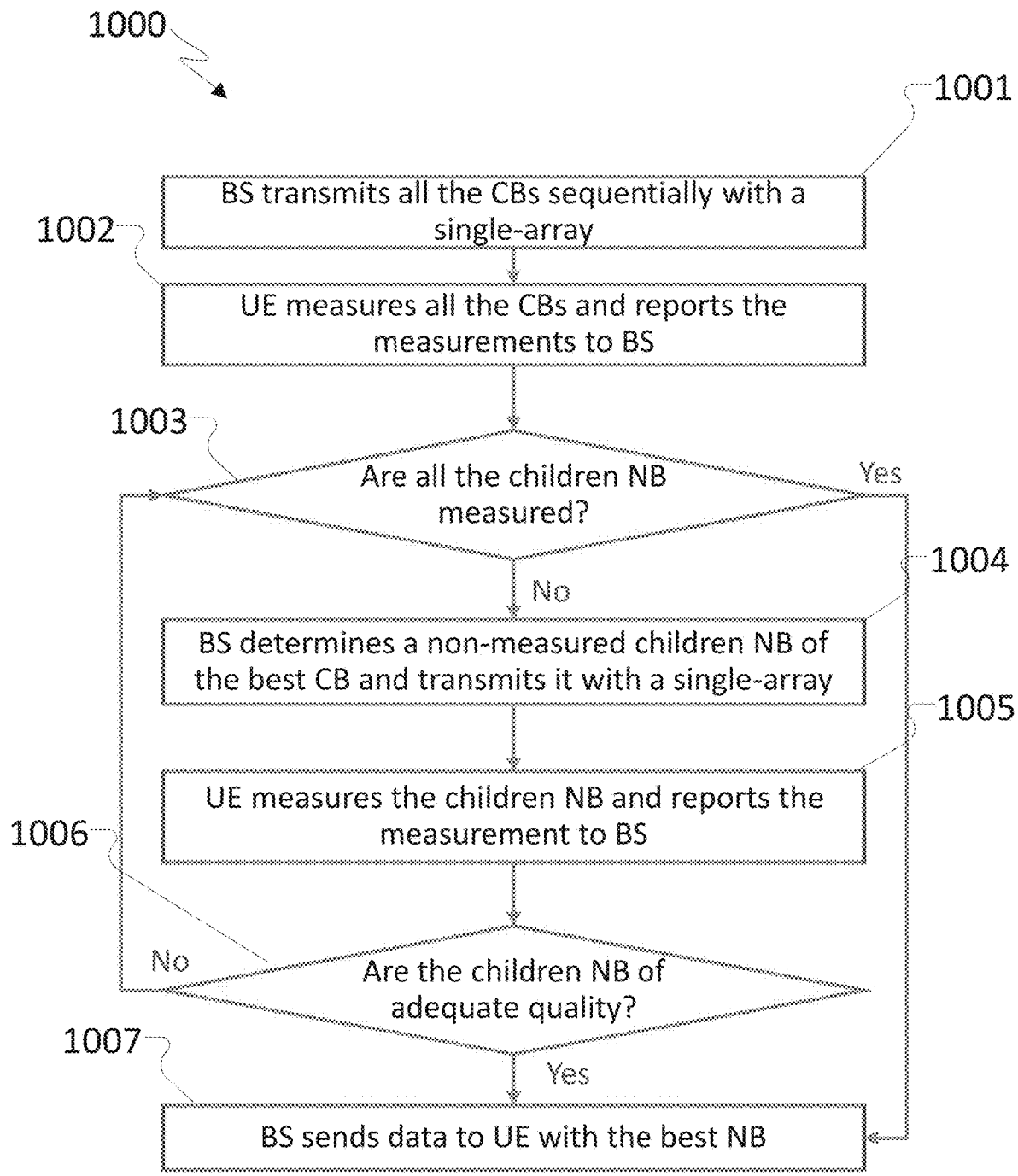
FIG. 10 illustrates an example of a flowchart for beam association according to various embodiments of the present disclosure.

FIG. 10 illustrates an example of a flowchart for a method 1100 of beam association according to various embodiments of the present disclosure. The steps of the method 1000 of FIG. 10 can be performed by any of the BSs 101-103 of FIG. 1, such as the BS 102 of FIG. 2 in connection with any of the UEs 111-116 of FIG. 1. The method 1000 is for illustration only and other embodiments can be used without departing from the scope of the present disclosure.

The method 1100 begins in step 1001, with the BS transmitting a plurality of composite beams, e.g., with a reference signal such as a SSB, sequentially with a single array according to embodiments disclosed herein. For example, in step 1001, beamforming weights for the composite beams may be determined according to machine learning disclosed herein. The UE measures all the composite beams among the plurality of composite beams and reports the measurement information to the BS in step 1002. The BS determines whether all children NBs are then verified to have been measured 1003. If all the children NBs were measured 1003, the BS transmits data to the UE with the predicted NB 1007. If one or more of the children beams is not measured in step 1003, the BS determines a non-measured child NB of the predicted composite beam and transmits it with a single array 1004. The UE then measures the child NB and reports the measurement information to the BS 1005. The BS determines whether the children NB are of adequate quality 1006. If one or more of the children are not of sufficient quality, steps 1003-1006 are repeated continuously until a the child NB is identified of sufficient quality. If the a child NB is deemed to be of sufficient quality, the BS transmits data with the predicted NB to the UE in step 1007.

Figure 11A:
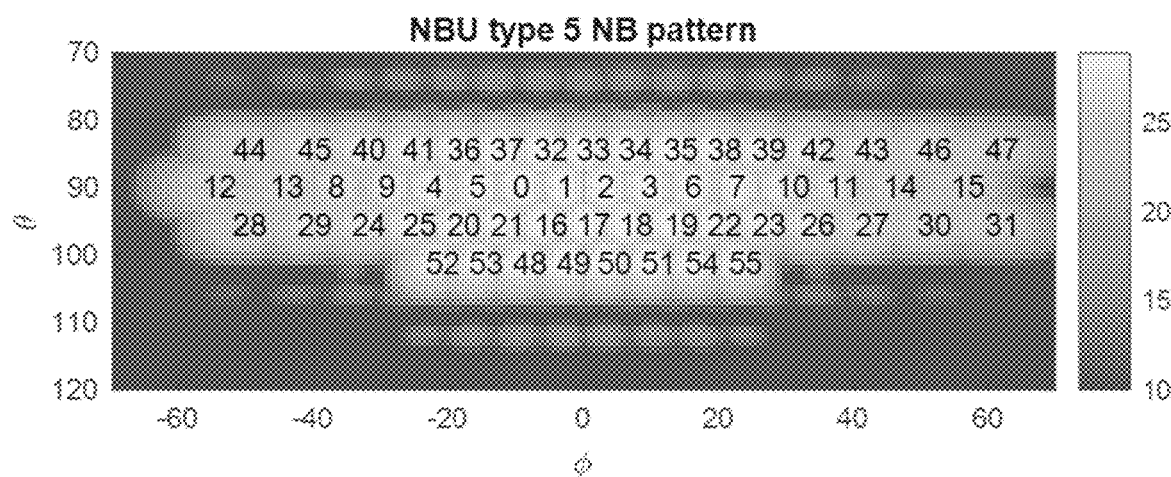
FIG. 11A illustrates an example of a NB pattern according to various embodiments of the present disclosure.

FIG. 11A illustrates an example of a NB pattern according to various embodiments of the present disclosure. FIGS. 11B-11F illustrate examples of wideband (WB) clustering for a 14-beam wide beam codebook according to various embodiments of the present disclosure. The examples provided in FIGS. 11A-11F are for illustration only and other embodiments can be used without departing from the scope of the present disclosure.

In these examples, in FIG. 11A, NB pattern in the angular domain for a size-56 NB codebook with four rows is illustrated. For example, the boresight WB is designed by a concave-utility-function method and shifted to the desired angles. In FIGS. 11B-11F, for example, display a size-14 WB codebook with a range of two to four rows, where each of the WBs corresponds to 2 or more NBs. FIGS. 11B-11F illustrate various embodiments of WB clustering that may be used in embodiments of the present disclosure. The embodiments are not limited in this context, codebooks of various WB and/or NB sizes can be used.

Figure 11B:
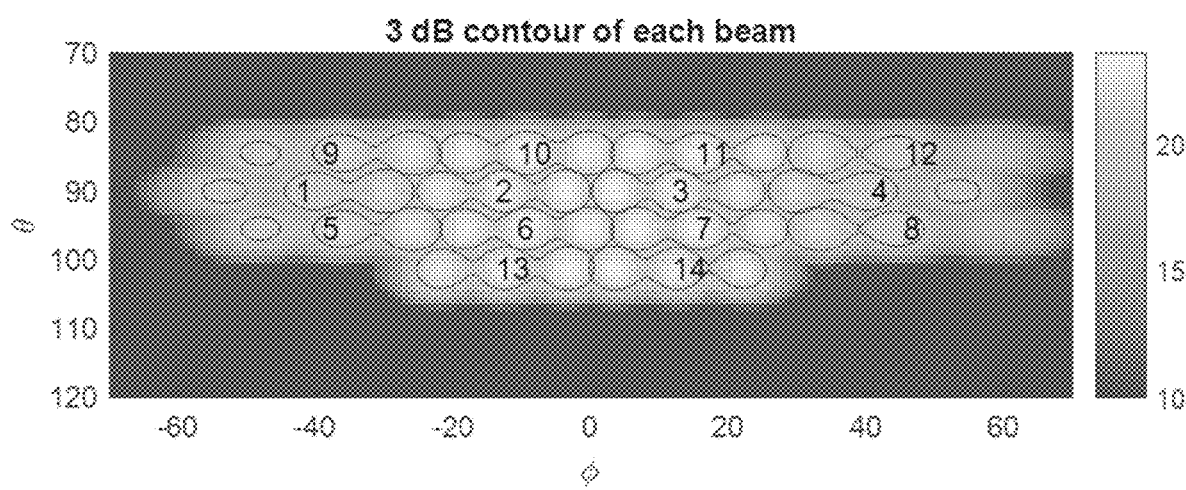
FIGS. 11B-11F illustrate examples of wideband (WB) clustering for a 14-beam wide beam codebook according to various embodiments of the present disclosure.
Figure 11C:
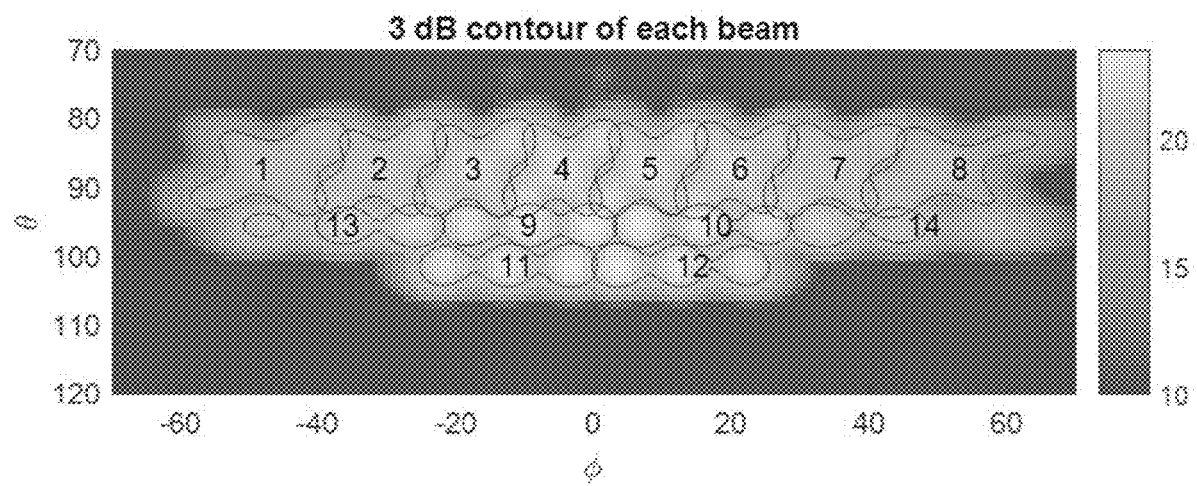
Figure 11D:
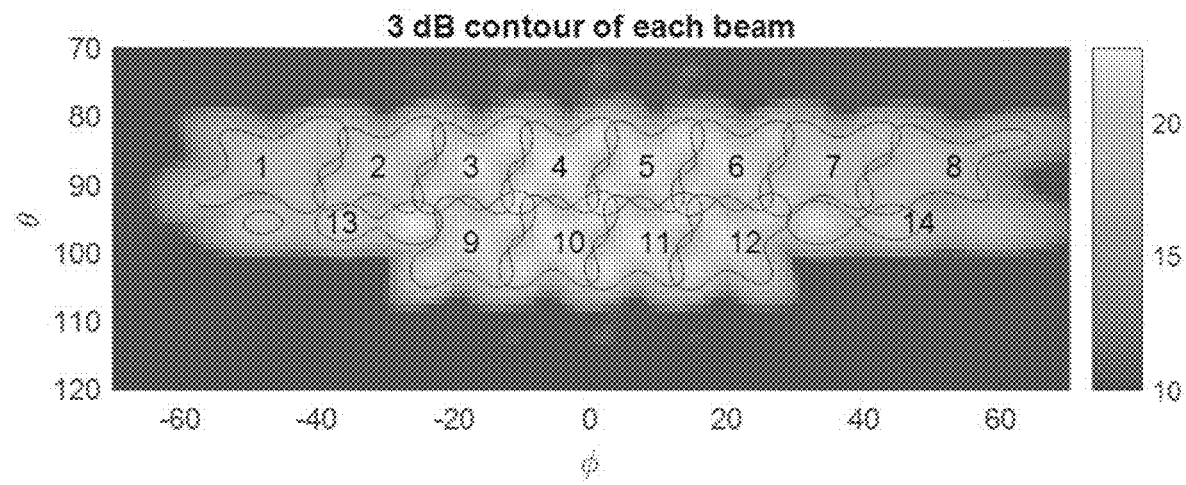
Figure 11E:
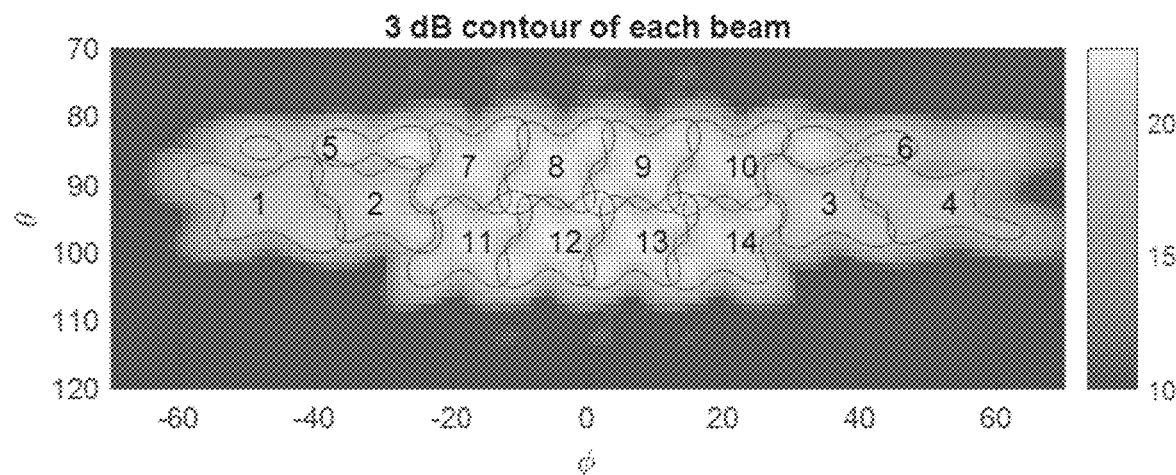
Figure 11F:
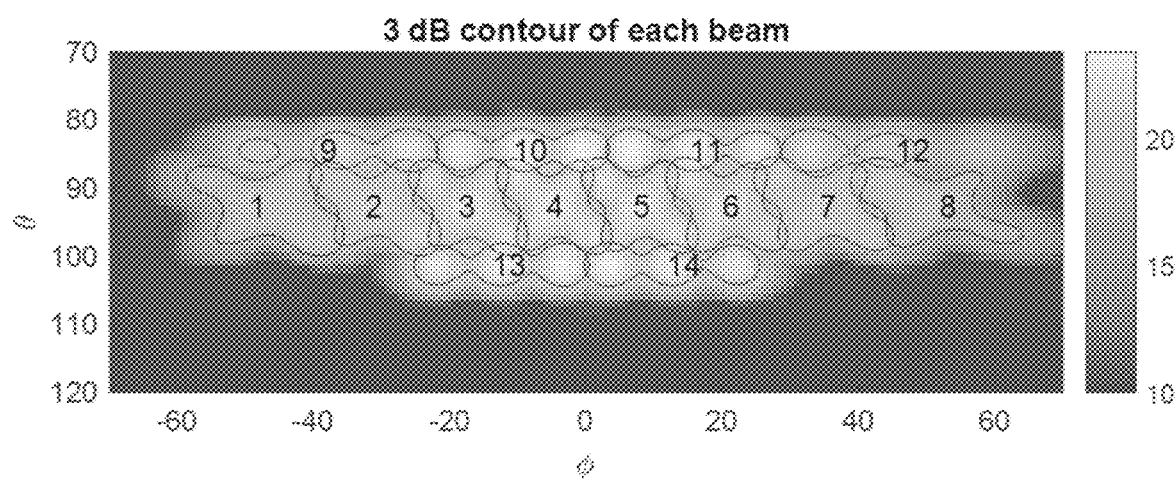

FIG. 11B, is an example of a WB design that includes 14 long WBs. In some embodiments, the clustering can be modified to group WBs according to various shapes, regions, and/or angles. For example, FIG. 11C illustrates WBs grouped into 8 diamond WBs and 6 long WBs. In another embodiment, FIG. 11D illustrates 12 diamond WBs and 2 long WBs. FIGS. 11D and 11E illustrates a WB design including 12 diamond WBs and 2 long WBs in varying configurations. FIG. 11F is an example of 8 diamond WBs and 6 long WBs. Although this disclosure uses examples for designing WBs according to size-14 groupings, the embodiments are not limited in this context. For example, the WBs can be grouped according to larger or smaller groupings. The WBs can also be grouped according to different shapes and sizes.

Figure 12:
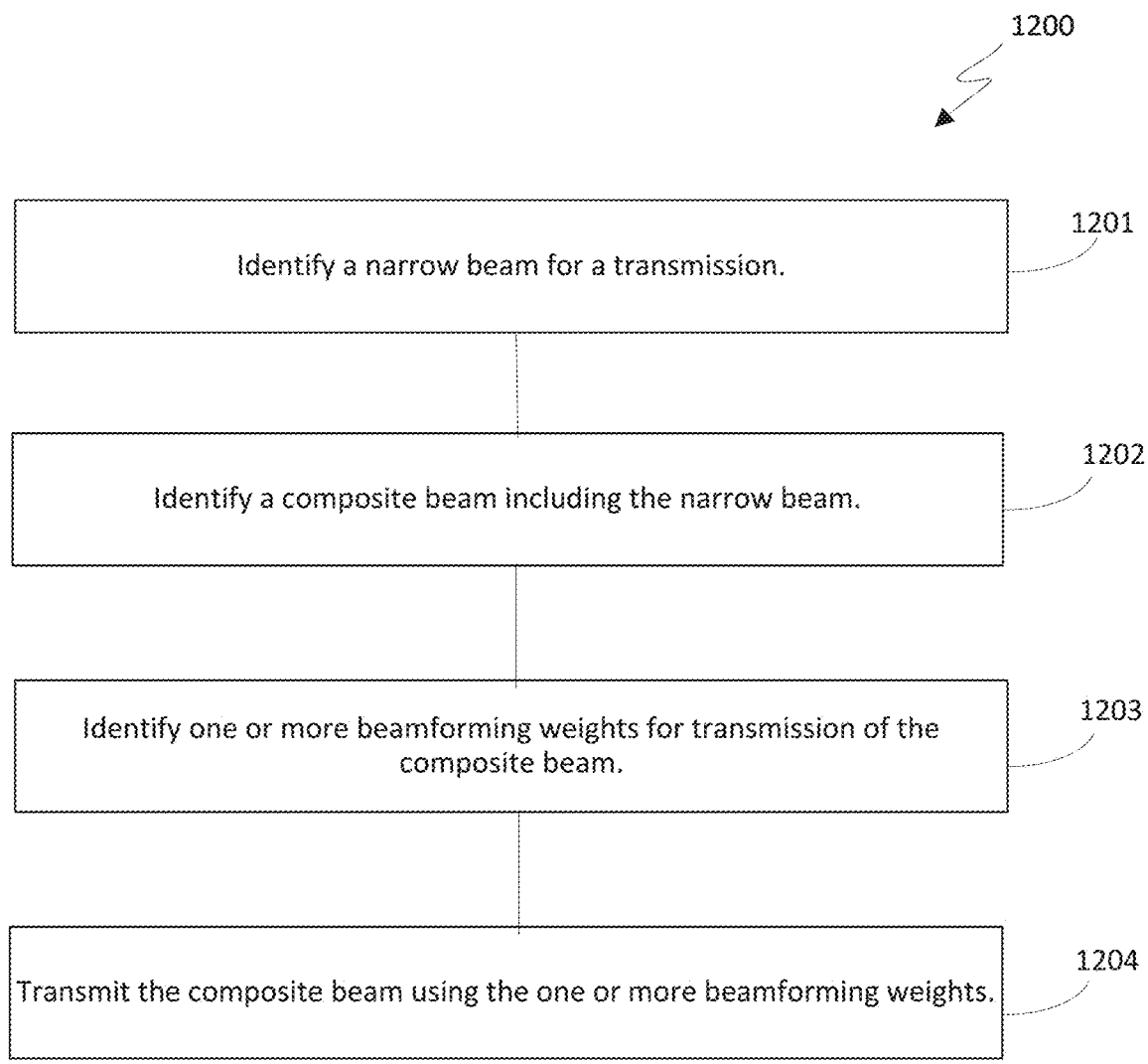
FIG. 12 illustrates a flowchart of an example method for transmitting a composite beam according to various embodiments of the present disclosure.

FIG. 12 illustrates a flowchart of an example method 1200 for transmitting a composite beam according to various embodiments of the present disclosure. The steps of the method 1200 of FIG. 12 can be performed by any of the BSs 101-103 of FIG. 1, such as the BS 102 of FIG. 2. The method 1200 is for illustration only and other embodiments can be used without departing from the scope of the present disclosure.

The method begins with the BS identifying a narrow beam for a transmission (step 1201). For example, in step 1201, the BS the narrow beam is identified based on feedback received from a user equipment, for example, as discussed above with regard to FIG. 10 above. The BS then identifies a composite beam including the narrow beam (step 1202). For example, in step 1202, the BS identifies the composite beam based on an association between one or more composite beams and one or more narrow beams. In various embodiments, this association between the composite beams and the narrow beams is identified from a hierarchical tree structure.

The BS then identifies one or more beamforming weights for transmitting the composite beam (step 1203). For example, in step 1203, the BS identifies the one or more beamforming weights for transmitting the composite beam from a composite beam codebook where the beamforming weights are determined based on machine learning, for example, as discussed above with regard to FIG. 8A.

The BS then transmits the composite beam using the one or more beamforming weights (step 1204). For example, in step 1204, the BS may transmit the composite beam using a single antenna array. For example, the one or more beamforming weights include a first number of beamforming weights for a first subset of antenna elements in the single antenna array and a second number of beamforming weights for a second subset of antenna elements in the single antenna array, where the first subset of antenna elements generates a first beam of the composite beam and the first subset of antenna elements generates a second beam of the composite beam, for example, as discussed above with regard to FIGS. 7A-7C. In various embodiments, the first subset of antenna elements and the second subset of antenna elements are interleaved in the single antenna array, for example, as discussed above with regard to FIG. 7C.

Figure 13:
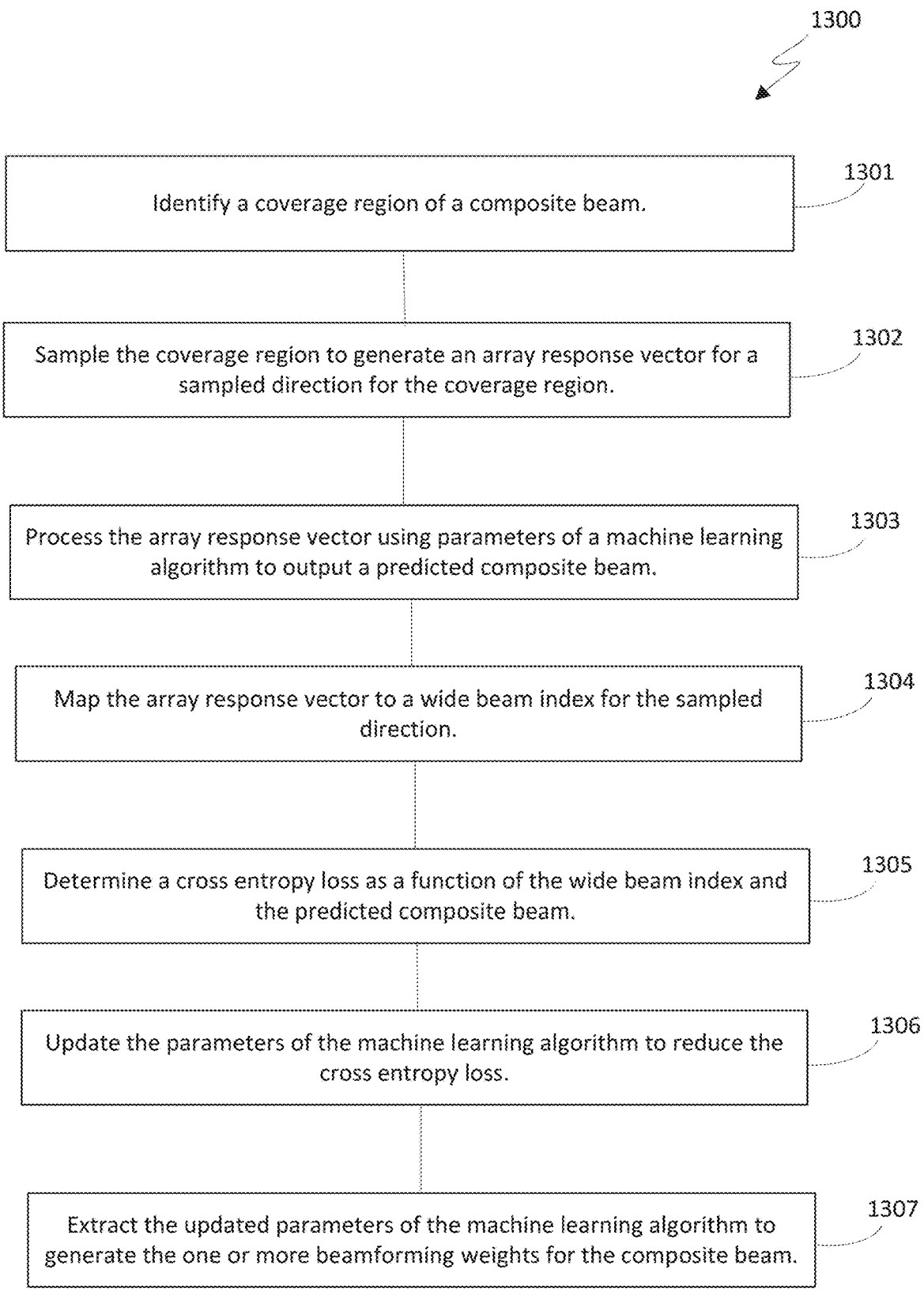
FIG. 13 illustrates a flowchart of an example method for determining beamforming weight(s) for a composite beam using machine learning according to various embodiments of the present disclosure.

FIG. 13 illustrates a flowchart of an example method 1300 for determining beamforming weights for a composite beam using machine learning according to various embodiments of the present disclosure. The method 1300 is for illustration only and other embodiments can be used without departing from the scope of the present disclosure.

The steps of the method 1300 of FIG. 13 can be performed by the computing device 400 of FIG. 4 or any of the BS s 101-103 of FIG. 1, such as the BS 102 of FIG. 2 collectively and individually referred to here as "the system." For example, in various embodiments, the beamforming weight(s) for the composite beam may be determined in an offline manner by a server or computer, for example, the computing device 400 of FIG. 4 based on testing of beam patterns and training of a machine learning algorithm. In other embodiments, the beamforming weight(s) for the composite beam may be determined in an online manner, for example, periodically or dynamically based on network conditions, by a base station or other network entity, for example, the BS 102 of FIG. 2 based on feedback regarding beam patterns and training of a machine learning algorithm or use of a pre-trained machine learning algorithm.

The method 1300 begins with the system 1300 identifying a coverage region of a composite beam (step 1301). For example, the coverage region includes at least a sub region associated with the narrow beam and another sub region associated with another narrow beam in the composite beam. The system then samples the coverage region to generate an array response vector for a sampled direction for the coverage region (step 1302). For example, in step 1302, the system may determine the array response vector based on a beamforming steering vector.

The system then processes the array response vector using parameters of a machine learning algorithm to output a predicted composite beam (step 1303). For example, in step 1303, the system uses the array response vector as the input to a machine learning algorithm that includes, for example, an ANN, such as described above with regard to FIGS. 8A-8B. The system then maps the array response vector to a WB index for the sampled direction (step 1304). For example, in step 1304, the WB index may be an index of a WB from a WB codebook that corresponds to a direction of the array response vector.

The system then determines a cross entropy loss as a function of the wide beam index and the predicted composite beam (step 1305). For example, in step 1305, the system may determine the cross entropy loss as described above with regard to FIGS. 8A-8B. The system then updates the parameters of the machine learning algorithm to reduce the cross entropy loss (step 1306). For example, in step 1306, the system may update the parameters to minimize (or further reduce) the cross entropy loss between vectors for probability of composite beam predicted by the ANN and encoding of the wide beam index. Thereafter, the system may return to step 1303 to continue process the array response vector using the updated parameters in an iterative manner through machine learning to continue to reduce the cross entropy loss until minimized or reduced below a threshold.

The system then extracts the updated parameters of the machine learning algorithm to generate the one or more beamforming weights for the composite beam (step 1307). For example, in step 1307, the system may utilize the latest updated parameters from a latest iteration where the cross entropy loss was minimized or reduced below the threshold to determine the beamforming weight(s), for example, as described above with regard to FIGS. 8A-8B.

Thereafter, the system may generate a composite beam codebook including information indicating sets of one or more beamforming weights corresponding to composite beam indexes, respectively. These sets of beamforming weight(s) may be separately determined as discussed above for each of a set of array response vectors representing a set of composite beams, respectively, to be used in the wireless network. For example, the sets of beamforming weight(s) may be determined using respective parameters of the machine learning algorithm that are separately updated for coverage regions of composite beams corresponding to the composite beam indexes, respectively.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the

What is claimed is:

1. A method comprising:
    identifying a narrow beam for a transmission;
    identifying a composite beam including the narrow beam based on an association between one or more composite beams and one or more narrow beams;
    identifying a coverage region of the composite beam;
    determining a concave utility function based on the coverage region of the composite beam;
    identifying one or more beamforming weights for transmitting the composite beam, the one or more beamforming weights determined based on machine learning; and
    generating the composite beam using the one or more beamforming weights according to the concave utility function.

2. The method of claim 1, further comprising:
    sampling the coverage region to generate an array response vector for a sampled direction for the coverage region;
    processing the array response vector using parameters of a machine learning algorithm to output a predicted composite beam;
    mapping the array response vector to a wide beam index for the sampled direction;
    determining a cross entropy loss as a function of the wide beam index and the predicted composite beam;
    updating the parameters of the machine learning algorithm to reduce the cross entropy loss; and
    extracting the updated parameters of the machine learning algorithm to generate the one or more beamforming weights for the composite beam.

3. The method of claim 2, further comprising:
    generating a composite beam codebook including information indicating sets of one or more beamforming weights corresponding to composite beam indexes, respectively,
    wherein the sets of one or more beamforming weights are determined using respective parameters of the machine learning algorithm that are separately updated for coverage regions of composite beams corresponding to the composite beam indexes, respectively, and
    wherein identifying the one or more beamforming weights for transmitting the composite beam comprises identifying the one or more beamforming weights for transmitting the composite beam using the composite beam codebook.

4. The method of claim 2, wherein the coverage region includes at least a sub region associated with the narrow beam and another sub region associated with another narrow beam in the composite beam.

5. The method of claim 1, wherein:
    the narrow beam is identified based on feedback received from a user equipment; and
    the association between the composite beam and the narrow beam is identified from a hierarchical tree structure.

6. The method of claim 1, wherein the composite beam is transmitted using a single antenna array.

7. The method of claim 6, wherein:
    the one or more beamforming weights include a first number of beamforming weights for a first subset of antenna elements in the single antenna array and a second number of beamforming weights for a second subset of antenna elements in the single antenna array;
    the first subset of antenna elements and the second subset of antenna elements are interleaved in the single antenna array;
    the first subset of antenna elements generates a first beam of the composite beam; and
    the first subset of antenna elements generates a second beam of the composite beam.

8. An apparatus comprising:
    a first processor configured to:
        identify a narrow beam for a transmission;
        identify a composite beam including the narrow beam based on an association between one or more composite beams and one or more narrow beams;
        identify a coverage region of the composite beam;
        determine a concave utility function based on the coverage region of the composite beam; and
        identify one or more beamforming weights for transmission of the composite beam, the one or more beamforming weights determined based on machine learning; and
    a transceiver operably coupled to the first processor, the transceiver configured to generate the composite beam using the one or more beamforming weights according to the concave utility function.

9. A system comprising the apparatus of claim 8, further comprising:
    a second processor configured to:
    sample the coverage region to generate an array response vector for a sampled direction for the coverage region;
    process the array response vector using parameters of a machine learning algorithm to output a predicted composite beam;
    map the array response vector to a wide beam index for the sampled direction;
    determine a cross entropy loss as a function of the wide beam index and the predicted composite beam;
    update the parameters of the machine learning algorithm to reduce the cross entropy loss; and
    extract the updated parameters of the machine learning algorithm to generate the one or more beamforming weights for the composite beam.

10. The system of claim 9, wherein:
    the second processor is further configured to generate a composite beam codebook including information indicating sets of one or more beamforming weights corresponding to composite beam indexes, respectively,
    wherein the sets of one or more beamforming weights are determined using respective parameters of the machine learning algorithm that are separately updated for coverage regions of composite beams corresponding to the composite beam indexes, respectively, and
    the first processor is further configured to identify the one or more beamforming weights for transmission of the composite beam using the composite beam codebook.

11. The system of claim 9, wherein the coverage region includes at least a sub region associated with the narrow beam and another sub region associated with another narrow beam in the composite beam.

12. The apparatus of claim 8, wherein:
the narrow beam is identified based on feedback received from a user equipment; and
the association between the composite beam and the narrow beam is identified from a hierarchical tree structure.

13. The apparatus of claim 8, wherein the composite beam is transmitted using a single antenna array of the transceiver.

14. The apparatus of claim 13, wherein:
the one or more beamforming weights include a first number of beamforming weights for a first subset of antenna elements in the single antenna array and a second number of beamforming weights for a second subset of antenna elements in the single antenna array;
the first subset of antenna elements and the second subset of antenna elements are interleaved in the single antenna array;
the first subset of antenna elements is configured to generate a first beam of the composite beam; and
the first subset of antenna elements configured to generate a second beam of the composite beam.

15. A non-transitory, computer-readable medium comprising program code that, when executed by a first processor of an apparatus, causes the apparatus to:
identify a narrow beam for a transmission;
identify a composite beam including the narrow beam based on an association between one or more composite beams and one or more narrow beams;
identify a coverage region of the composite beam;
determine a concave utility function based on the coverage region of the composite beam;
identify one or more beamforming weights for transmission of the composite beam, the one or more beamforming weights determined based on machine learning; and
generate the composite beam using the one or more beamforming weights according to the concave utility function.

16. The non-transitory, computer-readable medium of claim 15, further comprising program code that, when executed by a second processor, causes the second processor to:
sample the coverage region to generate an array response vector for a sampled direction for the coverage region;
process the array response vector using parameters of a machine learning algorithm to output a predicted composite beam;
map the array response vector to a wide beam index for the sampled direction;
determine a cross entropy loss as a function of the wide beam index and the predicted composite beam;
update the parameters of the machine learning algorithm to reduce the cross entropy loss; and
extract the updated parameters of the machine learning algorithm to generate the one or more beamforming weights for the composite beam.

17. The non-transitory, computer-readable medium system of claim 16, further comprising program code that, when executed by the second processor, causes the second processor to:
generate a composite beam codebook including information indicating sets of one or more beamforming weights corresponding to composite beam indexes, respectively, wherein the sets of one or more beamforming weights are determined using respective parameters of the machine learning algorithm that are separately updated for coverage regions of composite beams corresponding to the composite beam indexes, respectively, and
wherein the program code that, when executed, causes the apparatus to identify the one or more beamforming weights for transmission of the composite beam comprises program code that, when executed by the first processor, causes the apparatus to identify the one or more beamforming weights for transmission of the composite beam using the composite beam codebook.

18. The non-transitory, computer-readable medium of claim 15, wherein:
the narrow beam is identified based on feedback received from a user equipment; and
the association between the composite beam and the narrow beam is identified from a hierarchical tree structure.

19. The non-transitory, computer-readable medium of claim 15, wherein the composite beam is transmittable using a single antenna array by use of the one or more beamforming weights.

20. The non-transitory, computer-readable medium of claim 19, wherein:
the one or more beamforming weights include a first number of beamforming weights for a first subset of antenna elements in the single antenna array and a second number of beamforming weights for a second subset of antenna elements in the single antenna array;
the first subset of antenna elements and the second subset of antenna elements are interleaved in the single antenna array;
the first subset of antenna elements generates a first beam of the composite beam; and
the first subset of antenna elements generates a second beam of the composite beam.

* * * * *